(12) United States Patent
Yoshikawa et al.

(10) Patent No.: US 8,403,753 B2
(45) Date of Patent: Mar. 26, 2013

(54) COMPUTER-READABLE STORAGE MEDIUM STORING GAME PROGRAM, GAME APPARATUS, AND PROCESSING METHOD

(75) Inventors: Kazuhiro Yoshikawa, Kyoto (JP); Hitoshi Yamagami, Kyoto (JP); Toshio Noguchi, Suginami-ku (JP)

(73) Assignee: Nintendo Co., Ltd., Kyoto (JP)

( * ) Notice: Subject to any disclaimer, the term of this patent is extended or adjusted under 35 U.S.C. 154(b) by 779 days.

(21) Appl. No.: 12/340,835

(22) Filed: Dec. 22, 2008

(65) Prior Publication Data

US 2010/0081506 A1   Apr. 1, 2010

(30) Foreign Application Priority Data

Sep. 30, 2008   (JP) ................................. 2008-255560

(51) Int. Cl.
*A63F 13/06* (2006.01)
*A63F 9/24* (2006.01)
(52) U.S. Cl. ................ 463/37; 463/36; 463/43
(58) Field of Classification Search ............ 463/36, 463/37, 43
See application file for complete search history.

(56) References Cited

U.S. PATENT DOCUMENTS

| | | | |
|---|---|---|---|
| 6,544,125 B2 * | 4/2003 | Horigami et al. | 463/38 |
| 6,743,099 B2 * | 6/2004 | Yabe et al. | 463/36 |
| 7,001,272 B2 * | 2/2006 | Yamashita et al. | 463/7 |
| 2001/0039207 A1 * | 11/2001 | Horigami et al. | 463/31 |
| 2002/0151337 A1 * | 10/2002 | Yamashita et al. | 463/8 |

OTHER PUBLICATIONS

"Dengeki DS & Wii Style vol. 2", *ASCII Media Works Inc.*, released Aug. 1, 2007, p. 28 (*Partial Translation*).
"Shuukan Famitsu Aug. 3, 2007 Edition", Enterbrain Inc., released on Aug. 3, 2007, p. 152 (*Partial Translation*).
"Kadukeusu Z Futatsu No Choushittou instruction manual", Atlus Co., Ltd., released on Dec. 2, 2006, p. 25 (*Partial Translation*).
"Shuukan Famitsu Aug. 17, 2007 edition", Enterbrain Inc., released on Aug. 17, 2007, p. 119 (*Partial Translation*).

* cited by examiner

*Primary Examiner* — Matthew W Such
*Assistant Examiner* — Robert Carpenter
(74) *Attorney, Agent, or Firm* — Nixon & Vanderhye, P.C.

(57) ABSTRACT

First, based on the position of a target in a taken image included in imaging information, a pointing position which an operating device points to is calculated. Next, a change amount of the pointing position within a predetermined time is calculated. Then, whether or not the change amount of the pointing position satisfies a first condition is determined. As a result, when it is determined that the change amount of the pointing position satisfies the first condition, predetermined processing is executed in which the pointing position within the predetermined time or a position calculated based on pointing positions within the predetermined time is set as a start point.

12 Claims, 25 Drawing Sheets

FIG. 3
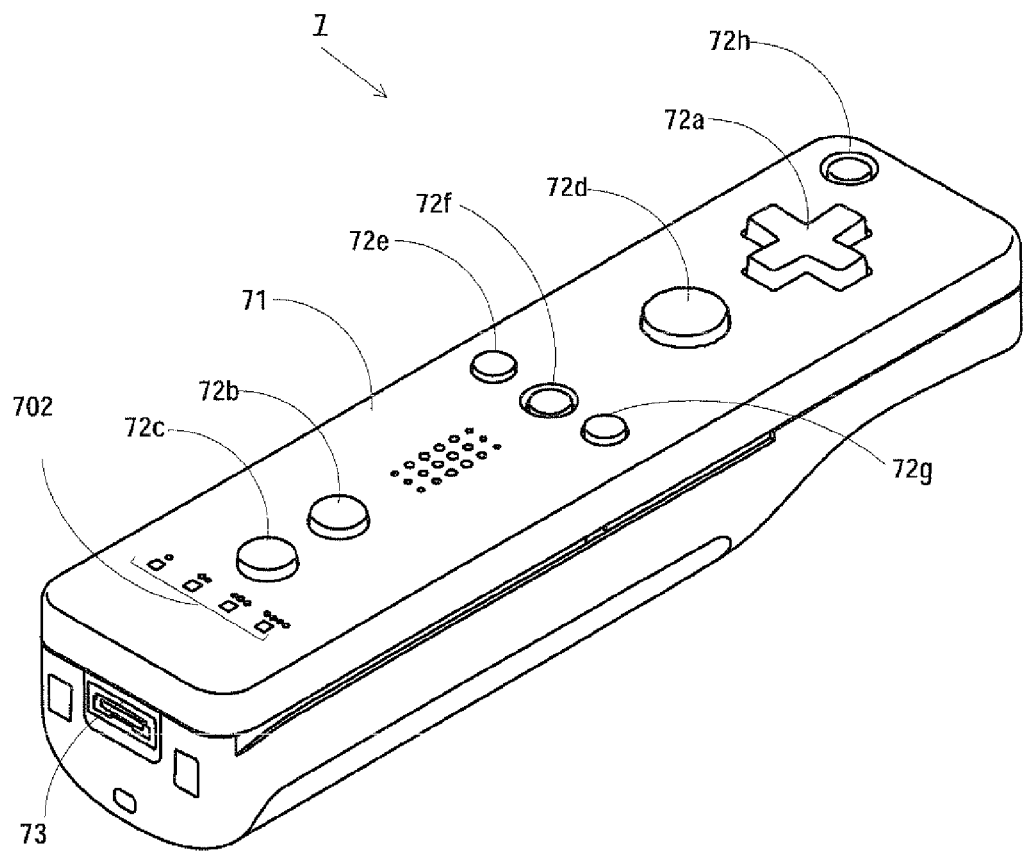
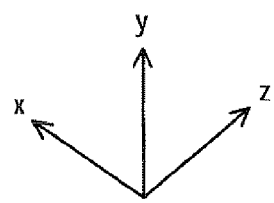

COMPUTER-READABLE STORAGE MEDIUM STORING GAME PROGRAM, GAME APPARATUS, AND PROCESSING METHOD

CROSS REFERENCE TO RELATED APPLICATION

The disclosure of Japanese Patent Application No. 2008-255560, filed on Sep. 30, 2008, is incorporated herein by reference.

BACKGROUND OF THE INVENTION

1. Field of the Invention

The present invention relates to a computer-readable storage medium storing a game program, a game apparatus, and a processing method, and more particularly, to a computer-readable storage medium storing a game program, a game apparatus, and a processing method for executing predetermined processing based on imaging information which is obtained by imaging means, of an operating device, for taking an image of at least one target whose image is to be taken and which imaging information is transmitted from the operating device.

2. Description of the Background Art

Conventionally, there is known a game apparatus which starts a predetermined motion based on an operation with an input device equipped with an image pickup device (e.g. "DENGEKI DS&Wii Style Vol. 2", ASCII MEDIA WORKS Inc., released on Aug. 1, 2007, P28 (hereinafter, referred to as Non-Patent Document 1), "Shuukan Famitsu Aug. 3, 2007 edition", ENTERBRAIN INC., released on Aug. 3, 2007, P152 (hereinafter, referred to as Non-Patent Document 2), "Kadukeusu Z Futatsu No Choushittou instruction manual", ATLUS CO., LTD., released on Dec. 2, 2006, 225 (hereinafter, referred to as Non-Patent Document 3)). In games disclosed in the Non-Patent Documents 1 and 2, an input device is used like a sword, and an enemy object displayed on a screen is cut by swinging the input device. By swinging the input device vertically, horizontally, and obliquely, three types of cutting attacks, "vertical cutting", "horizontal cutting", and "oblique cutting", can be performed according to the swinging direction. A trajectory of the sword in each cutting attack has an angle in accordance with the vertical, horizontal, or oblique swinging of the input device. When performing an operation for a cutting attack, the position of a "pointer" displayed on the screen can be locked by pressing a predetermined button (pointer lock). When the input device is swung in a state where the position of the pointer is locked, the position of the pointer becomes the center of a sword trajectory. When the pointer is not locked, a sword trajectory passes through the center of the screen.

Meanwhile, a game disclosed in the Non-Patent Document 3 is a surgery game in which an input device is used like a scalpel. For example, when the trunk of a patient is displayed on a screen and an operation for incising skin is performed, a marker indicating a part to be incised is displayed on the screen. Then, the operation for incision can be performed by moving a cursor along the marker with a button of a controller pressed. If the cursor can be moved not far from the marker, the incision is successfully made.

However, the above game apparatus have the following problems. In the games disclosed in the Non-Patent Documents 1 and 2, when performing an operation for a cutting attack, if the pointer is not locked, a sword trajectory always passes through the center of the screen. Thus, if a cutting attack with a sword trajectory which does not pass through the center of the screen is desired, the pointer lock is necessary. In other words, a two-step operation need to be performed that a button operation is performed for the pointer lock and then the input device is swung. Therefore, unless an operation for the pointer lock is performed, it is impossible to cut a desired position. Further, because such a two-step operation is needed, there is a problem that a cutting attack operation cannot be performed quickly. Further, in the games disclosed in the Non-Patent Documents 1 and 2, regardless of the length and the speed of swinging by a player, the sword trajectory of a cutting attack always extends linearly from end to end of the screen. In other words, for an effect (animation) for the sword trajectory which is to be displayed at the cutting attack, a pattern in accordance with a direction of vertical, horizontal, or oblique swinging is merely readout from among some predetermined sword trajectory patterns, and reproduced. Thus, it is impossible to perform an operation for cutting a part of the screen, not from end to end of the screen. Therefore, there is a problem that a cutting attack operation lacks a degree of freedom.

Meanwhile, in the game disclosed in the Non-Patent Document 3, it is possible to perform an operation for cutting only a part of the screen. However, the operation for incision in the game is an operation of moving the cursor along the marker displayed on the screen, and a position desired by a player cannot be freely cut by the operation for incision. Thus, similarly as in the games disclosed in the Non-Patent Documents 1 and 2, there is a problem that an operation for cutting a desired position lacks a degree of freedom.

SUMMARY OF THE INVENTION

Therefore, an object of the present invention is to provide a computer-readable storage medium storing a game program, a game apparatus, and a processing method which enable operations with a high degree of freedom.

The present invention has the following features to attain the object mentioned above. It is noted that reference characters and supplementary explanations in parentheses are merely provided to facilitate the understanding of the present invention in relation to the later-described embodiment, rather than limiting the scope of the present invention in any way.

A first aspect of the present invention is directed to a computer-readable storage medium storing a game program executed by a computer of a game apparatus for executing predetermined processing based on imaging information which is obtained by imaging means, of an operating device, for taking an image of at least one target whose image is to be taken and which imaging information is transmitted from the operating device. The game program causes the computer to function as pointing position calculation means (S3), change amount calculation means (S6), first determination means (S7), and processing start means (S10 to S13). The pointing position calculation means is means for repeatedly calculating a pointing position which the operating device points to based on a position of the target in a taken image included in the imaging information. The change amount calculation means is means for repeatedly calculating a change amount of the pointing position within a predetermined time. The first determination means is means for determining whether or not the change amount of the pointing position within the predetermined time satisfies a first condition. The processing start means is means for, when the first determination means determines that the change amount of the pointing position within the predetermined time satisfies the first condition, starting predetermined processing in which the pointing position within the predetermined time or a position calculated based on pointing positions within the predetermined time is set as a start point.

According to the first aspect, a position desired by a player is set as a start point, and processing can be started when the change amount of the pointing position of the operating device satisfies a condition, thereby providing the player with a game having operability with a high degree of freedom.

In a second aspect based on the first aspect, the game program causes the computer to further function as second determination means (S18) and processing end means (S19 to S22). The second determination means is means for, after the predetermined processing is started by the processing start means, determining whether or not the change amount of the pointing position within the predetermined time which is calculated by the change amount calculation means satisfies a second condition. The processing end means is means for, when the second determination means determines that the change amount of the pointing position satisfies the second condition, ending the predetermined processing started by the processing start means.

According to the second aspect, an arbitrary position can be set as an end point for the processing, thereby providing operability with a high degree of freedom.

In a third aspect based an the first aspect, the target is located adjacent to a predetermined display device. The game program causes the computer to further function as in-screen pointing determination means (S5) for determining whether or not the position of the target in the taken image exists in a screen correspondence range which is assigned to a screen of the display device.

According to the third aspect, it is possible to execute the predetermined processing in which a position in the screen desired by the player is set as a start point.

In a fourth aspect based on the third aspect, when the in-screen pointing determination means determines that the position of the target in the taken image exists in the screen correspondence range and the first determination means determines that the change amount of the pointing position satisfies the first condition, the processing start means starts the predetermined processing.

According to the fourth aspect, it is possible to set a position in the screen desired by the player as a start point, and to execute the predetermined processing when the change amount of the pointing position of the operating device satisfies a condition.

In a fifth aspect based on the third aspect, when the in-screen pointing determination means determines that the position of the target in the taken image does not exist in the screen correspondence range after the processing start means starts the predetermined processing, the processing end means ends the predetermined processing started by the processing start means.

According to the fifth aspect, when the operating device points to a position out of the screen after the predetermined processing is started with a position in the screen desired by the player being set as a start point, the processing can be ended, thereby enhancing the operability.

In a sixth aspect based on the second aspect, the game program causes the computer to further function as object drawing means (S13) for, during a period after the predetermined processing is started by the processing start means until the predetermined processing is ended by the processing end means, drawing a predetermined object at a position in the screen corresponding to the pointing position calculated by the pointing position calculation means.

In a seventh aspect based on the second aspect, the game program causes the computer to further function as trajectory drawing means (S13) for, during a period after the predetermined processing is started by the processing start means until the predetermined processing is ended by the processing end means, drawing a trajectory connecting in chronological order pointing positions calculated by the pointing position calculation means.

According to the sixth and seventh aspects, it can be made easy for the player to know a position in the screen for which the processing is executed.

In an eighth aspect based on the first aspect, the game program causes the computer to further function as hit determination means (S41) and hit processing execution means (S42). The hit determination means is means for, during a period after the predetermined processing is started until the predetermined processing is ended, determining whether or not a predetermined object exists at a position in a virtual game space corresponding to the pointing position. The hit processing execution means is means for, when the hit determination means determines that the predetermined object exists at the position in the virtual game space corresponding to the pointing position, executing hit processing which is predetermined processing executed for the predetermined object.

According to the eighth aspect, after the predetermined processing is started by the processing start means, different processing can be further executed for the object through which the pointing position has passed. Thus, for example, realistic feeling of an operation for "cutting" a predetermined object is enhanced, and hence the fun of the game can be enhanced.

In a ninth aspect based on the eighth aspect, the hit processing execution means includes continuation parameter change means (S42) for, when the hit determination means determines that the predetermined object exists, changing a value of a continuation parameter which is a parameter indicative of whether or not to continue the predetermined processing started by the processing start means. The game program causes the computer to further function as third determination means (S51) for, after the predetermined processing is started by the processing start means, determining whether or not the value of the continuation parameter satisfies a third condition. When the third determination means determines that the value of the continuation parameter satisfies the third condition, the processing end means ends the predetermined processing started by the processing start means.

According to the ninth aspect, it is possible to end the processing started by the processing start means even when the change amount of the pointing position does not satisfy the second condition, thereby enhancing the fun of the game.

A tenth aspect of the present invention is directed to a game apparatus (3) for executing predetermined processing based on imaging information which is obtained by imaging means, of an operating device (7), for taking an image of at least one target (8) whose image is to be taken and which imaging information is transmitted from the operating device. The game apparatus comprises pointing position calculation means (10), change amount calculation means (10), first determination means (10), and processing start means (10). The pointing position calculation means is means for repeatedly calculating a pointing position which the operating device points to based on a position of the target in a taken image included in the imaging information. The change amount calculation means is means for repeatedly calculating a change amount of the pointing position within a predetermined time. The first determination means is means for determining whether or not the change amount of the pointing position within the predetermined time satisfies a first condition. The processing start means is means for, when the first determination means determines that the change amount of the pointing position within the predetermined time satisfies the first condition, starting predetermined processing in which the pointing position within the predetermined time or a position calculated based on pointing positions within the predetermined time is set as a start point.

An eleventh aspect of the present invention is directed to a processing method for executing predetermined processing based on imaging information which is obtained by imaging means, of an operating device, for taking an image of at least one target whose image is to be taken and which imaging information is transmitted from the operating device. The processing method comprises a pointing position calculation step (S3), a change amount calculation step (S6), a first determination step (S7), and a processing start step (S10 to S13). At the pointing position calculation step, a pointing position which the operating device points to is repeatedly calculated based on a position of the target in a taken image included in the imaging information. At the change amount calculation step, a change amount of the pointing position within a predetermined time is repeatedly calculated. At the first determination step, whether or not the change amount of the pointing position within the predetermined time satisfies a first condition is determined. At the processing start step, when it is determined at the first determination step that the change amount of the pointing position within the predetermined time satisfies the first condition, predetermined processing is started with the pointing position within the predetermined time or a position calculated based on pointing positions within the predetermined time being set as a start point.

According to the tenth and eleventh aspects, the same advantageous effect as the first aspect can be obtained.

According to the present invention, because a start point in the screen for the predetermined processing can be determined based on the change amount of the pointing position, it is possible to provide a game having operability with a high degree of freedom.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view of a controller T in FIG. 1 seen from a top rear side thereof;

DESCRIPTION OF THE PREFERRED EMBODIMENTS

The following will describe an embodiment of the present invention with reference to the drawings. It is noted that the present invention is not limited by the embodiment.

(Whole Configuration of Game System)

Figure 1:
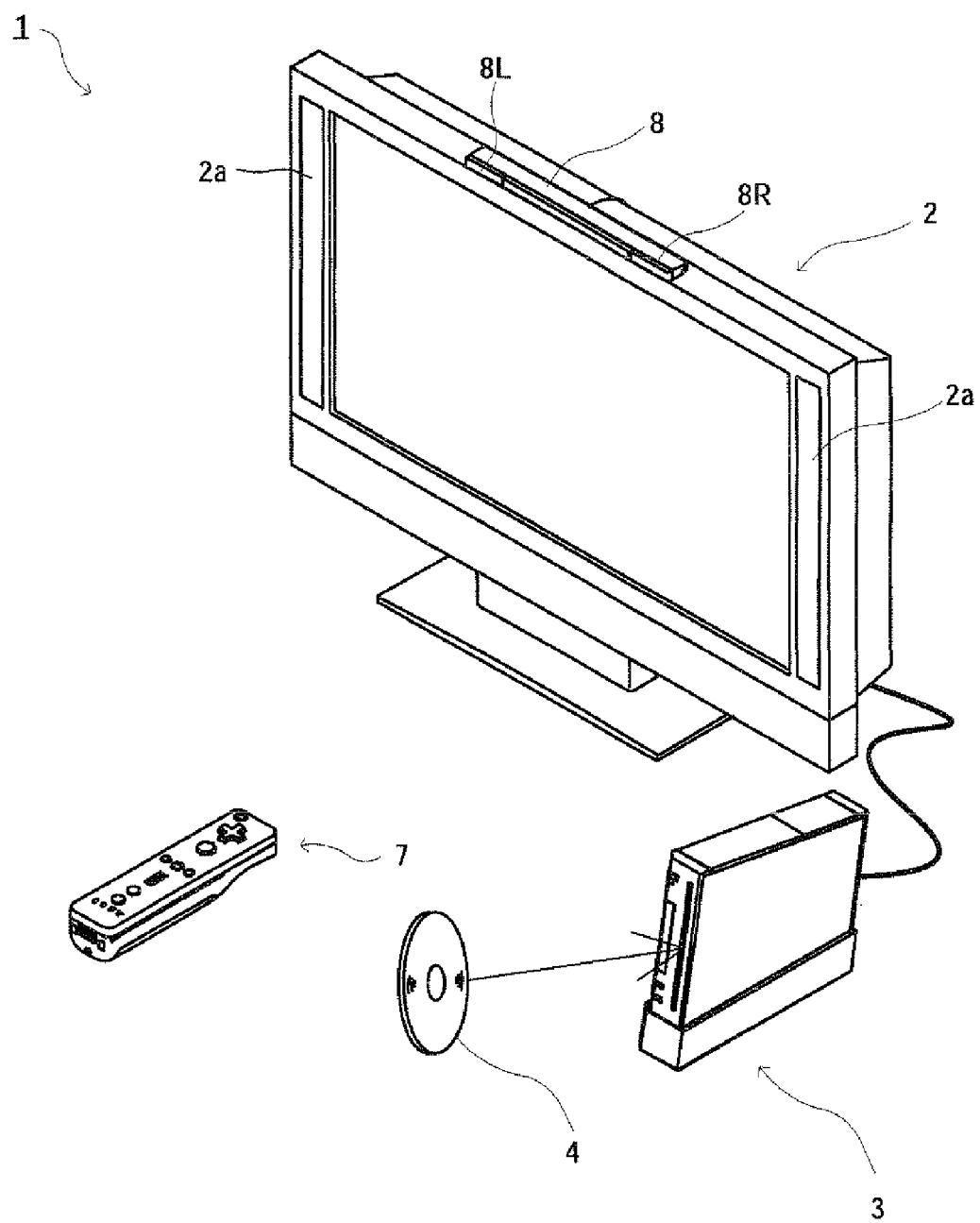
FIG. 1 is an external view of a game system 1 according to an embodiment of the present invention.

With reference to FIG. 1, the following will describe a game system 1 including a game apparatus according to the embodiment of the present invention. FIG. 1 is an external view of the game system 1. Hereinafter, the game system 1 using a stationary game apparatus will be used as an example, and the game apparatus and a game program according to the present embodiment will be described. As shown in FIG. 1, the game system 1 includes a television receiver (hereinafter, referred to merely as a television) 2, a game apparatus main body 3, an optical disc 4, a controller 7, and a marker section 8. The game system 1 executes game processing at the game apparatus main body 3 in accordance with a game operation using the controller 7.

The optical disc 4 as an example of an exchangeable information storage medium replaceably used with respect to the game apparatus main body 3 is detachably inserted in the game apparatus main body 3. The optical disc 4 stores a game program which is to be executed by the game apparatus main body 3. The game apparatus main body 3 has an insertion slot at its front surface. The game apparatus main body 3 reads and executes the game program stored in the optical disc 4 which is inserted in the insertion slot for executing the game processing.

The television 2 as an example of a display device is connected to the game apparatus main body 3 via a connection cord. The television 2 displays game images which are obtained as the result of the game processing executed by the game apparatus main body 3. The marker section 8 is mounted adjacent to the screen of the television 2 (on the upper surface of the screen in FIG. 1). The marker section 8 has a marker BR and a marker 82 at its opposite ends, respectively. The marker 8R has one or more infrared LEDs which output infrared lights forward from the television 2. The marker 8L has the same configuration as the marker BR. The marker section 8 is connected to the game apparatus main body 3, and the game apparatus main body 3 is capable of controlling illumination of each infrared LED of the marker section 8.

The controller 7 is an input device which provides the game apparatus main body 3 with operation data which indicates contents of an operation made to the controller 7. The controller 7 is connected to the game apparatus main body 3 by wireless communication. In the present embodiment, the technology of, for example, Bluetooth (registered trademark) is used for the wireless communication between the controller 7 and the game apparatus main body 3. It is noted that in an alternative embodiment, the controller 7 may be connected to the game apparatus main body 3 via a wire.

(Internal Configuration of Game Apparatus Main Body 3)

Figure 2:
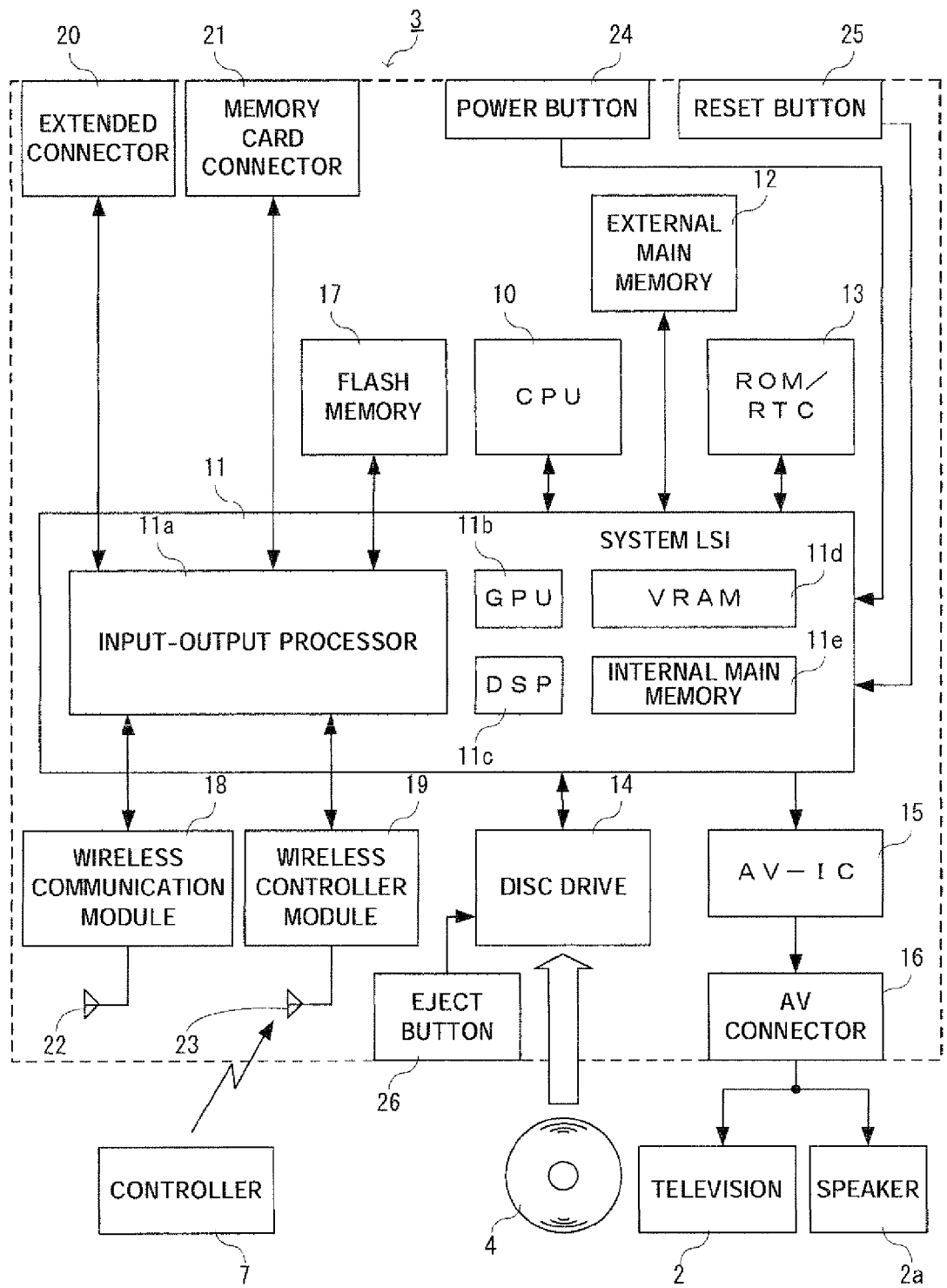
FIG. 2 is a functional block diagram of a game apparatus main body 3 in FIG. 1.

The following will describe an internal configuration of the game apparatus main body 3 with reference to FIG. 2. FIG. 2 is a block diagram showing a configuration of the game apparatus main body 3. The game apparatus main body 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the game apparatus main body 3, and a clock circuit (RTC: Real Time Clock) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms apart of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data and texture data, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the sound data generated thus are read by the AV-IC 15. The AV-IC 15 outputs the image data to the television 2 via an AV connector 16, and the sound data to speakers 2a built in the television 2. Thus, an image is displayed on the television 2, and sound is outputted from the speakers 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus main body 3 and the other game apparatus and various servers, the flash memory 17 may store saved data (result data or midstream data of the game) of the game played using the game apparatus main body 3.

The input-output processor 11a receives operation data transmitted from the controller 7 via the antenna 23 and the wireless controller module 19, and stores (temporarily stores)

the operation data in the buffer region of the internal main memory 11e or the external main memory 12.

In addition, the extended connector 20 and the memory card connector 21 are connected to the input-output processor 11a. The extended connector 20 is a connector for an interface such as USE and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium via the extended connector 20 and the memory card connector 21 for storing data in the external storage medium and reading data from the external storage medium.

The game apparatus main body 3 is provided with a power button 24, a reset button 25, and an eject button 26. The power button 24 and the reset button 25 are connected to the system LSI 11. When the power button 24 is turned on, electric power is supplied to each component of the game apparatus main body 3 via an AC adaptor (not shown). In the state where the power has been turned on, the power button 24 is pressed to shift to a low power standby mode. Even in the low power standby mode, electric power is supplied to the game apparatus main body 3. Because electric power is always supplied to the game apparatus main body 3, the game apparatus main body 3 can be always connected to a network such as the Internet even in this state. For turning off the power once the power is turned on, the power button 24 is pressed for a predetermined period of time or longer. The reset button 25 is pressed to cause the system LSI 11 to restart a boot program of the game apparatus main body 3. The eject button 26 is connected to the disc drive 14. The eject button 26 is pressed to eject the optical disc 4 from the disc drive 14.

Figure 4:
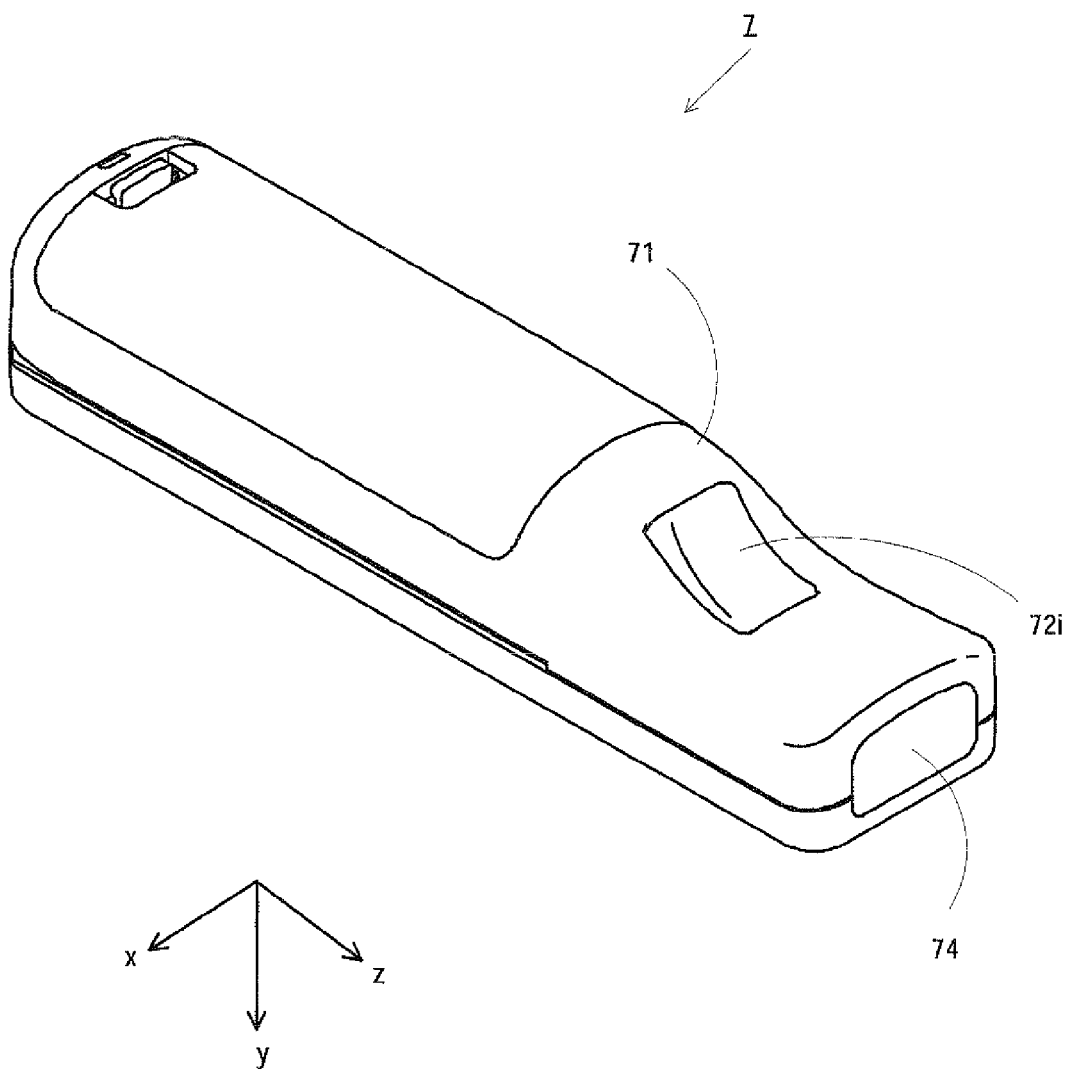
FIG. 4 is a perspective view of the controller 7 in FIG. 3 seen from a bottom front side thereof.

The following will describe the controller with reference to FIGS. 3 and 4. FIG. 3 is a perspective view of the controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player object or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus main body 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus main body 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus main body 3, one of the plurality of LEDs 702 which corresponds to the controller type of the controller 7 is lit up.

On the top surface of the housing 71, a plurality of holes is provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a is provided) is a positive direction of y-axis. The left-right direction of the controller 7 corresponds to x-axis, and the direction toward the right side surface housing 71 (the side surface which is not shown in FIG. 3 but shown in FIG. 4) is a positive direction of x-axis.

Figure 5:
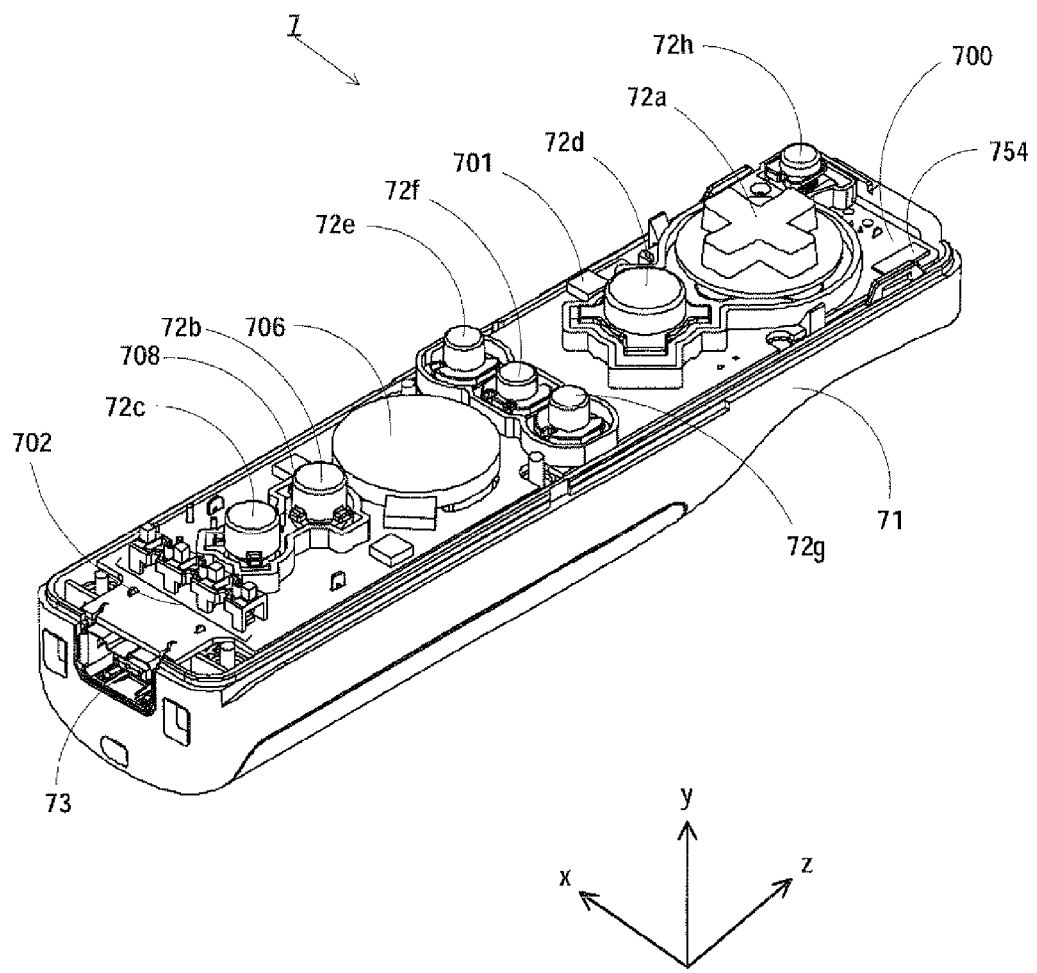
FIG. 5 is a perspective view showing a state where an upper housing of the controller 7 in FIG. 3 is removed.
Figure 6:
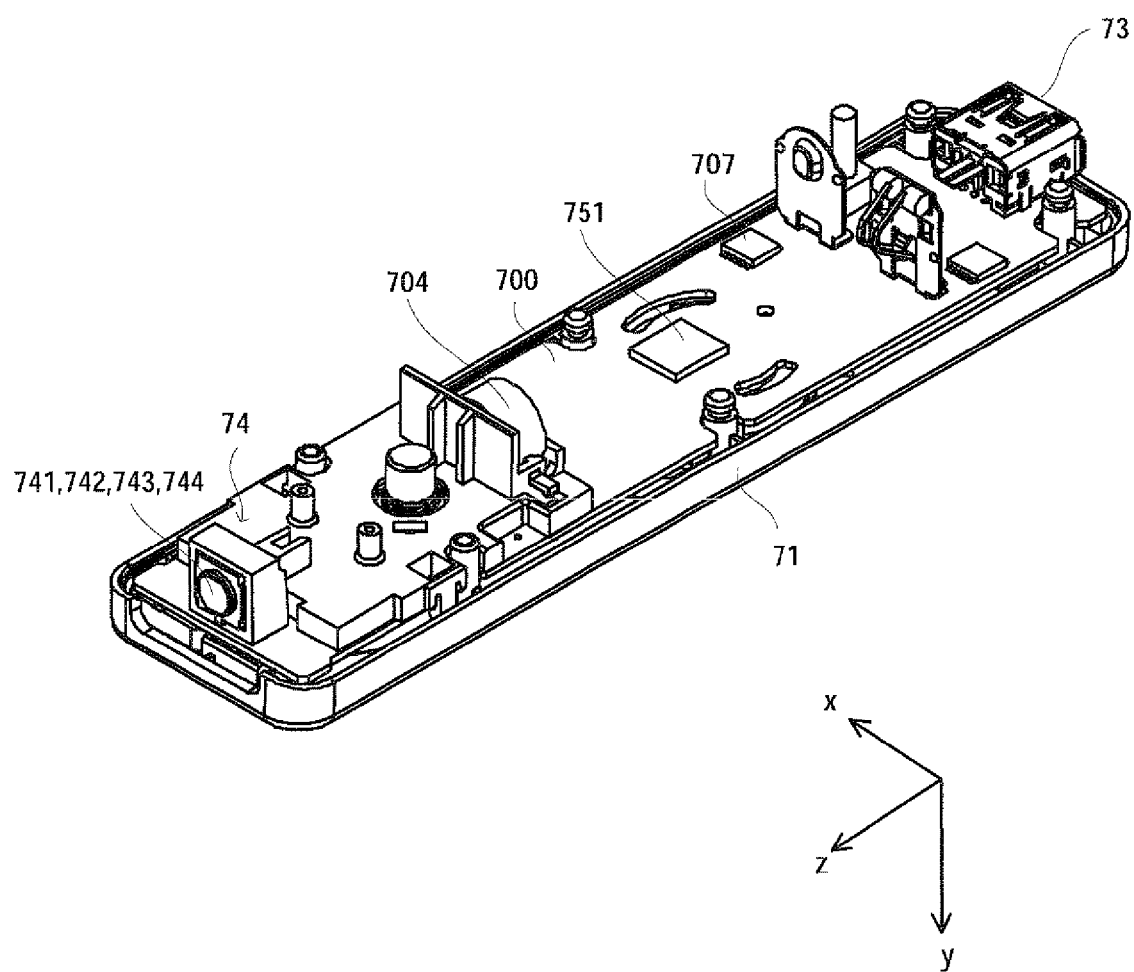
FIG. 6 is a perspective view showing a state where a lower housing of the controller 7 in FIG. 3 is removed.

The following will describe an internal structure of the controller 7 with reference to FIGS. 5 and 6. FIG. 5 is a perspective view showing a state where an upper housing (a part of the housing 71) of the controller 7 is removed as seen from a rear side thereof. FIG. 6 is a perspective view showing a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 6 and 7) by lines (not shown) formed on the substrate 700 and the like. The microcomputer 751 as an example of button data generation means of the present invention functions to generate operation button data in accordance with a type of the operation button 72a and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus main body 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus main body 3.

On the bottom main surface of the substrate 700, a vibrator 704 is attached. The vibrator 704 is, for example, a vibration motor or a solenoid. The vibrator 701 is connected to the microcomputer 751 by a line formed on the substrate 700 and the like, and actuated or unactuated in accordance with vibration data transmitted from the game apparatus main body 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

Figure 7:
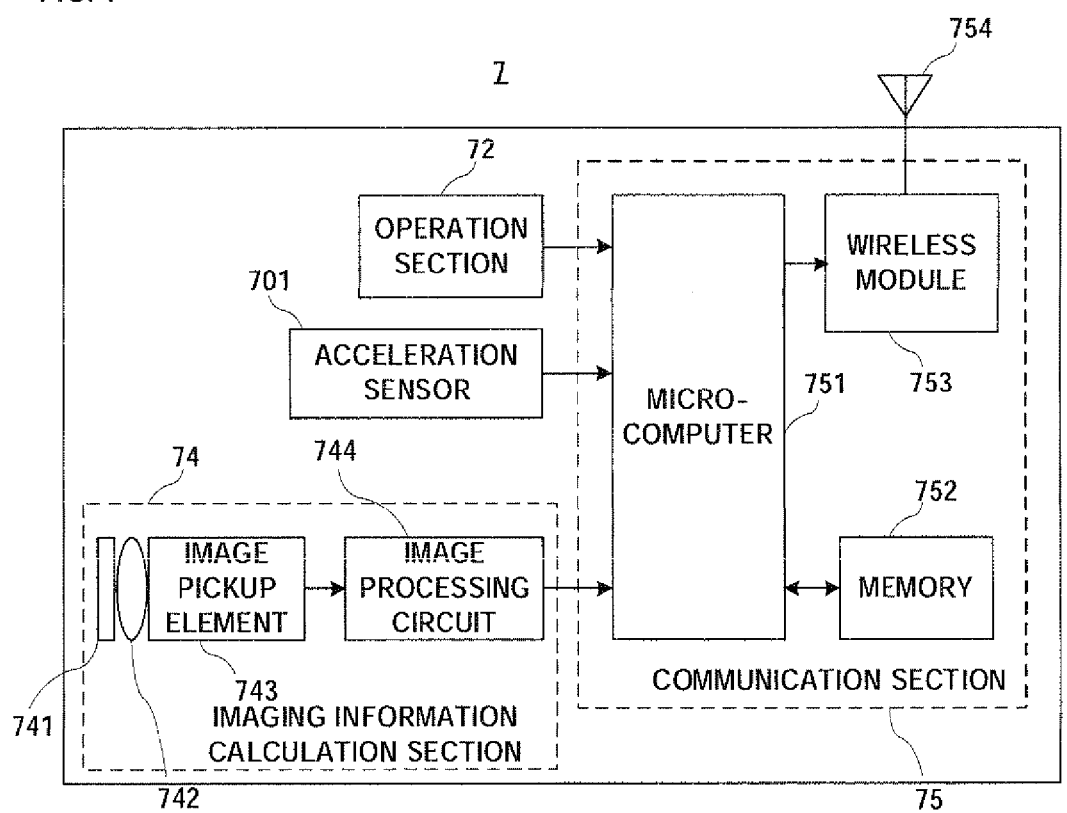
FIG. 7 is a block diagram showing a configuration of the controller 7 in FIG. 3.

The following will describe an internal constitution of the controller 7 with reference to FIG. 7. FIG. 7 is a block diagram showing an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. Here, the markers 8L and 8R located adjacent to the screen of the monitor 2 are infrared LED which output infrared lights forward, from the television 2. Thus, by providing the infrared filter 741, images of the markers 8L and 8R can be more accurately taken. The lens 742 converges the infrared light which has passed through the infrared filter 741, and outputs the infrared light to the image pickup element 743. The image pickup element 743 is a solid-state image pickup element such as a CMOS sensor or a COD. The image pickup element 743 takes an image of the infrared light collected by the lens 742. In other words, the image pickup element 743 takes an image of only the infrared light which has passed through the infrared filter 741. Then, the image pickup element 743 generates image data of the image. Hereinafter, an image taken by the image pickup element 743 is referred to as a taken image.

The image data generated by the image pickup element 743 is processed by the image processing circuit 744. The image processing circuit 744 calculates a position of a target whose image is to be taken (the markers 8L and 8R) in the taken image. The following will describe a method for calculating the position of the target with reference to FIG. 8.

Figure 8:
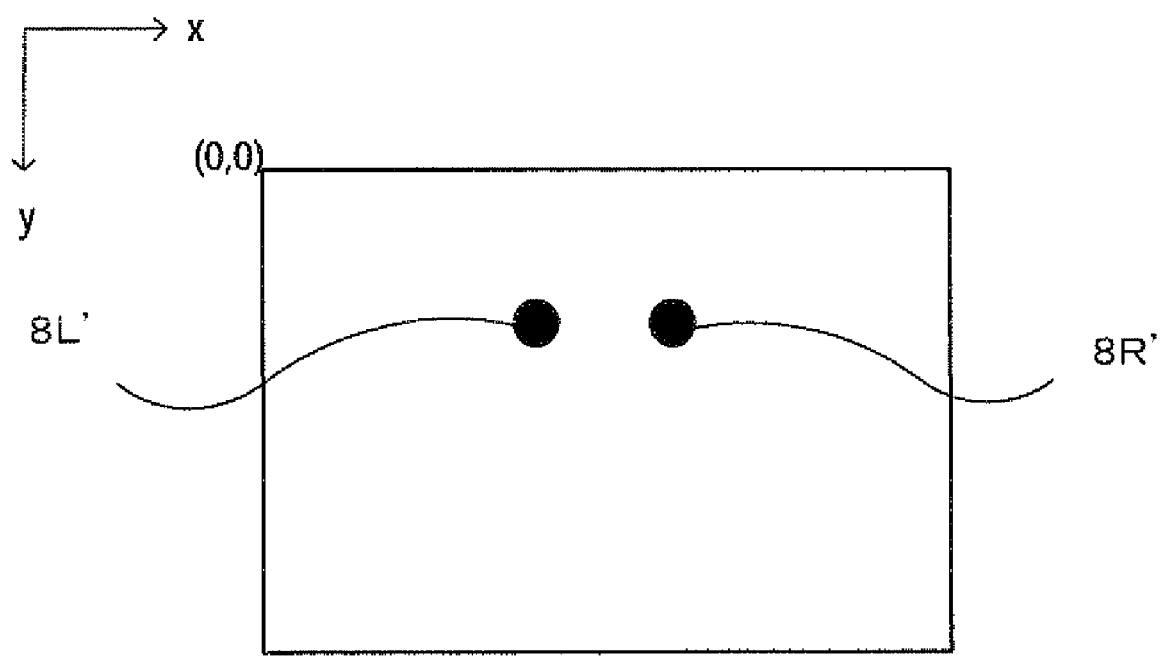
FIG. 8 is a view showing an example of a taken image.

FIG. 8 is a view showing an example of a taken image. In the taken image shown in FIG. 8, an image 8L' of the marker 8L and an image 8R' of the marker 8R are aligned side by side. When a taken image is inputted, the image processing circuit 744 calculates coordinates indicative a position of each region, in the taken image, which meets a predetermined condition. Here, the predetermined condition is a condition for identifying an image of the target (an target image), and is specifically that a region (high brightness region) has a brightness of a predetermined value or larger and a size of a predetermined range or larger. The predetermined condition may be a condition for identifying the target, and in an alternative embodiment, the predetermined condition may include a condition regarding a color of an image.

When calculating a position of the target image, the image processing circuit 794 identifies the high brightness region as a candidate for the target image from the whole area of the taken image. This is because the target image appears as a high brightness region in image data of the taken image. Next, based on the size of the identified high brightness region, the image processing circuit 744 executes determination processing of determining whether or not the high brightness region is the target image. The taken image may include images other than the target image by sunlight incoming through a window and light from a fluorescent lamp in a room, in addition to the images 81L' and 8R' of the two markers 8L and 8R which are target images. In this case, the images other than the images 8L' and 8R' of the markers 81, and 8R appear as high bright regions. The above determination processing is processing for distinguishing the images 8L' and 8R' of the markers 8L and 8R, which are target images, from the other images, and accurately identifying the target images. Specifically, in the determination processing, whether or not the identified high bright region has a size of a predetermined range or smaller is determined. When the high bright region has a size of the predetermined range or smaller, it is determined that the high bright region indicates a target image. When the high bright region does not have a size of the predetermined range or smaller, it is determined that the high bright region indicates an image other than the target images.

Further, the image processing circuit 744 calculates a position of the high bright region which is determined to indicate a target image as the result of the determination processing. Specifically, the image processing circuit 744 calculates a position of the center of the high bright region. It is noted that the position of the center can be calculated on a scale smaller than the resolution of the image pickup element 743. Here, the resolution of an image taken by the image pickup element 743 is 126×96, and the position of the center is calculated on a scale of 1024×768. In other words, the coordinate of the position of the center is represented by integer values of (0,0) to (1024,768). As shown in FIG. 8A, a position in the taken image is represented by a coordinate system (xy coordinate system) whose origin is at the upper left corner of the taken image, whose y axis positive direction is the downward direction, and whose x axis positive direction is the rightward direction.

As described above, the image processing circuit 744 calculates a coordinate indicative of a position of each region, in the taken image, which meets the predetermined condition. Hereinafter, a coordinate calculated by the image processing circuit 744 is referred to as a marker coordinate. The marker coordinate is a coordinate indicative of the position of a target in a coordinate system for representing a position in a plane corresponding to the taken image. The image processing circuit 744 outputs the marker coordinate to the microcomputer 751 of the communication section 75. Data of the marker coordinate is transmitted as operation data by the microcomputer 751 to the game apparatus main body 3. Because the marker coordinate changes in accordance with the facing direction (orientation) and the position of the controller 7, the game apparatus main body 3 can calculate the facing direction and the position of the controller 7 using the coordinate values. It is noted that although the image processing circuit 744 and/or the microcomputer 751 of the controller 7 execute processing until calculating the marker coordinate from the taken image in the present embodiment, for example, the taken image may be transmitted to the game apparatus main body 3 and the CPU 10 of the game apparatus main body 3 may execute the same processing as the processing thereafter.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micromachined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus (e.g. the CPU 10) or the processor of the controller 7 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

In an alternative embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and a linear acceleration sensor, corresponding changes need to be made to the processing operations which are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tile previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus main body 3 via the antenna 754. The sound IC 707 processes the sound data and the like transmitted from the game apparatus main body 3 via the communication section 75. The microcomputer 751 actuates the vibrator 704 in accordance with the vibration data (e.g. a signal for actuating or unactuating the vibrator 704) transmitted from the game apparatus main body 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be collected and transmitted at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the process result data from the imaging information calculation section 74 are modulated into the radio signal by the wireless module 753 and transmitted from the controller 7. The wireless controller module 19 of the game apparatus main body 3 receives the radio signal, and the game apparatus main body 3 demodulates or decodes the radio signal to obtain the series of operation information (the key data, the acceleration data, and the process result data). Based on the obtained operation information and the game program, the CPU 10 of the game apparatus main body 3 performs the game processing. In the case where the communication section 75 is structured using the Bluetooth (registered trademark) technology, the communication section 75 can have a function of receiving transmission data which is wirelessly transmitted from another device.

Figure 9:
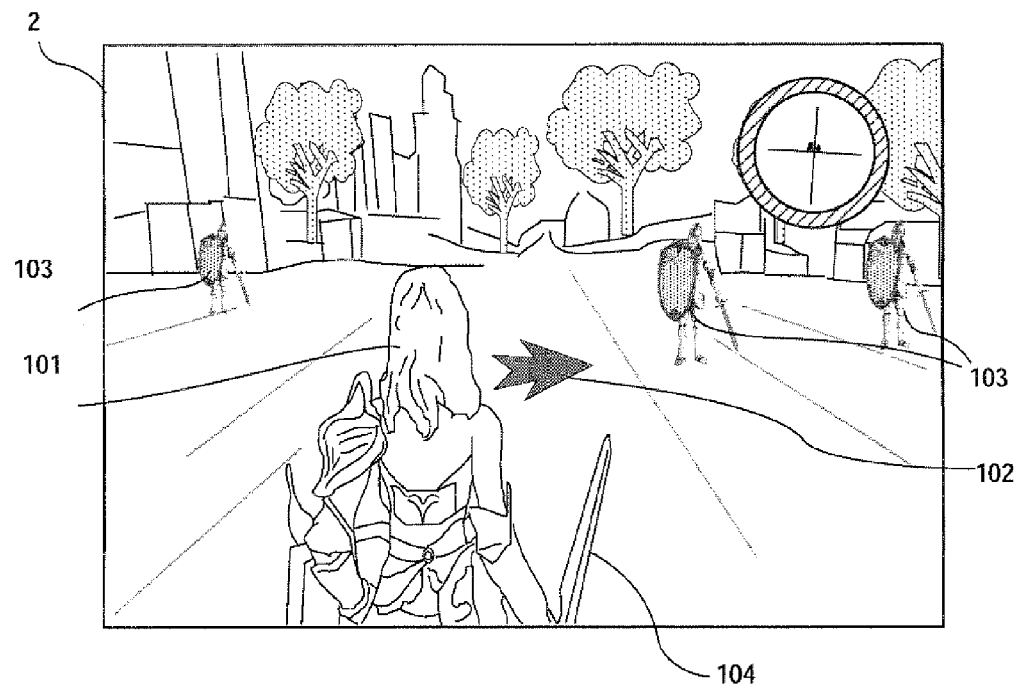
FIG. 9 shows an example of a game screen assumed in the present embodiment.

The following will describe an outline of a game assumed in the present embodiment with reference to FIGS. 9 to 27. The game assumed in the present embodiment is a sword-fighting game set in a virtual three-dimensional space. FIG. 9 shows an example of a game screen assumed in the present embodiment. As shown in FIG. 9, a player object 101, a cursor 102, enemy objects 103, and the like are displayed in the game screen. In the present game, the game screen is drawn based on a third person viewpoint for which a virtual camera is located behind the player object 101. The player object 101 holds a sword object 104. In the present game, the player object 101 defeats enemy objects 103 with the sword object 104.

Figure 10:
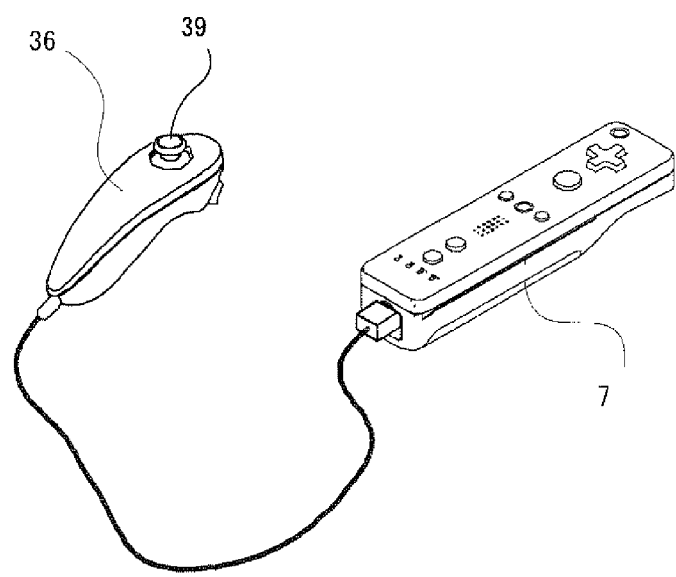
FIG. 10 is a view when an extended controller 36 is connected to a connector 73 of the controller 7.
Figure 11:
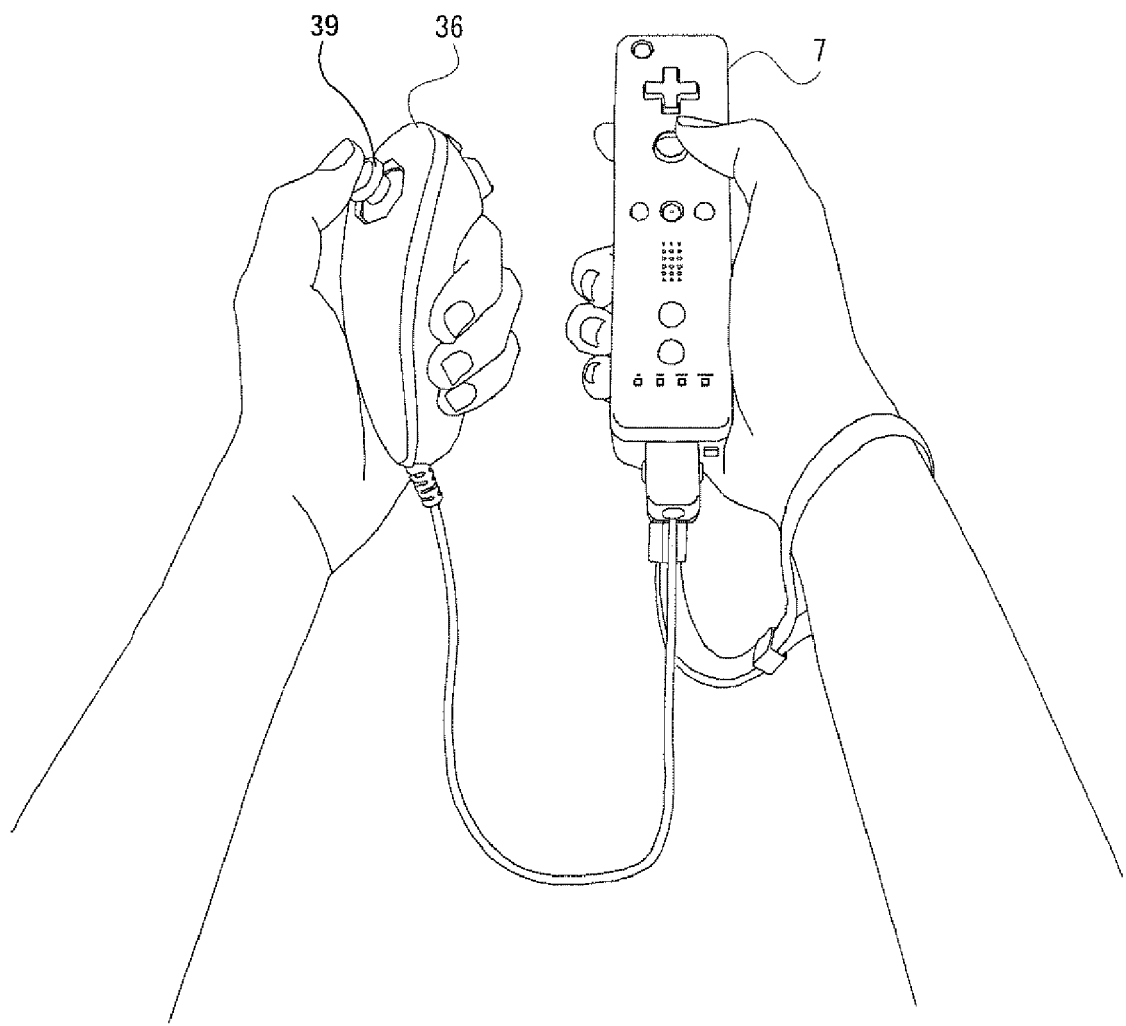
FIG. 11 is a view showing an example of a manner of holding the controller.
Figure 12:
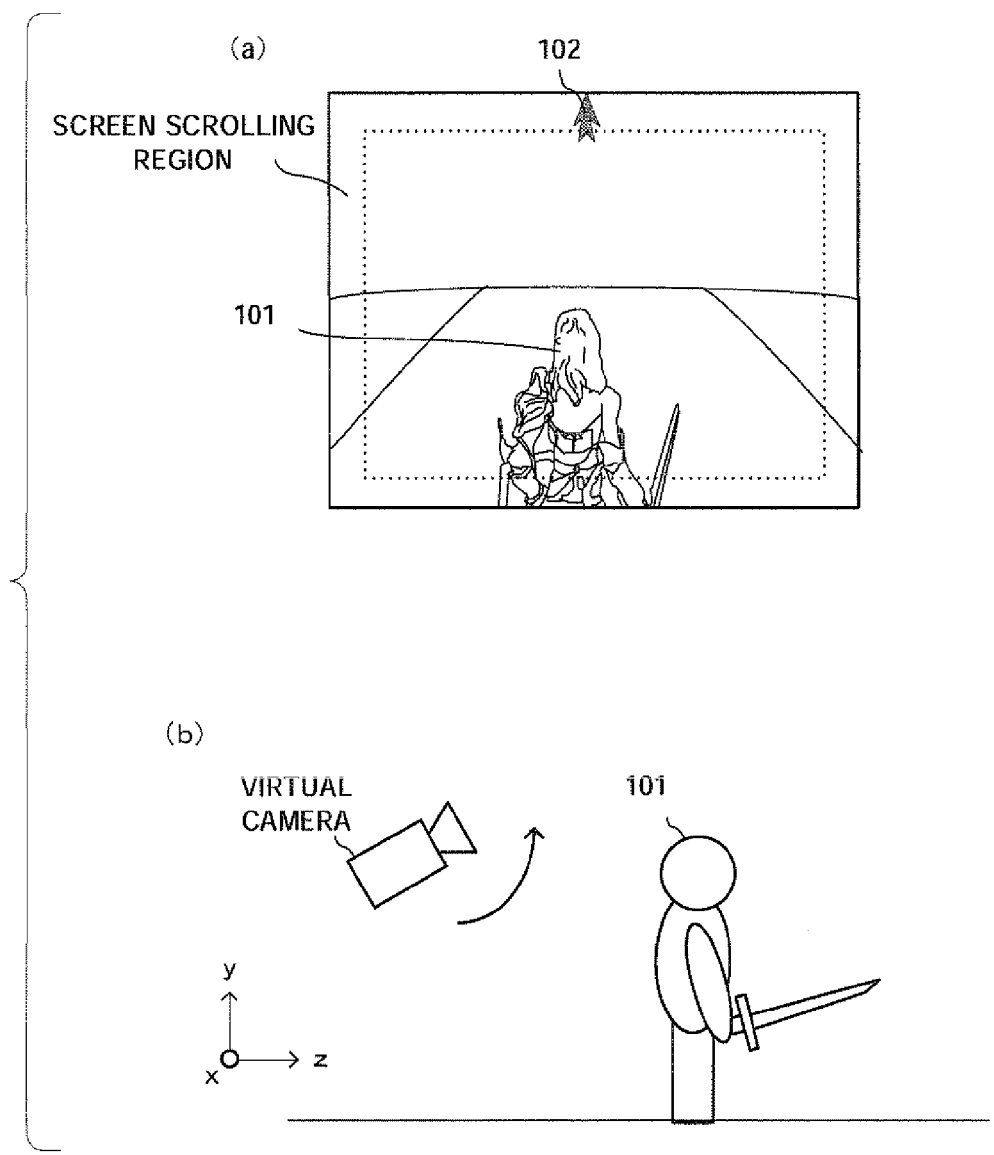
FIG. 12 is a view for explaining a screen scrolling operation.
Figure 13:
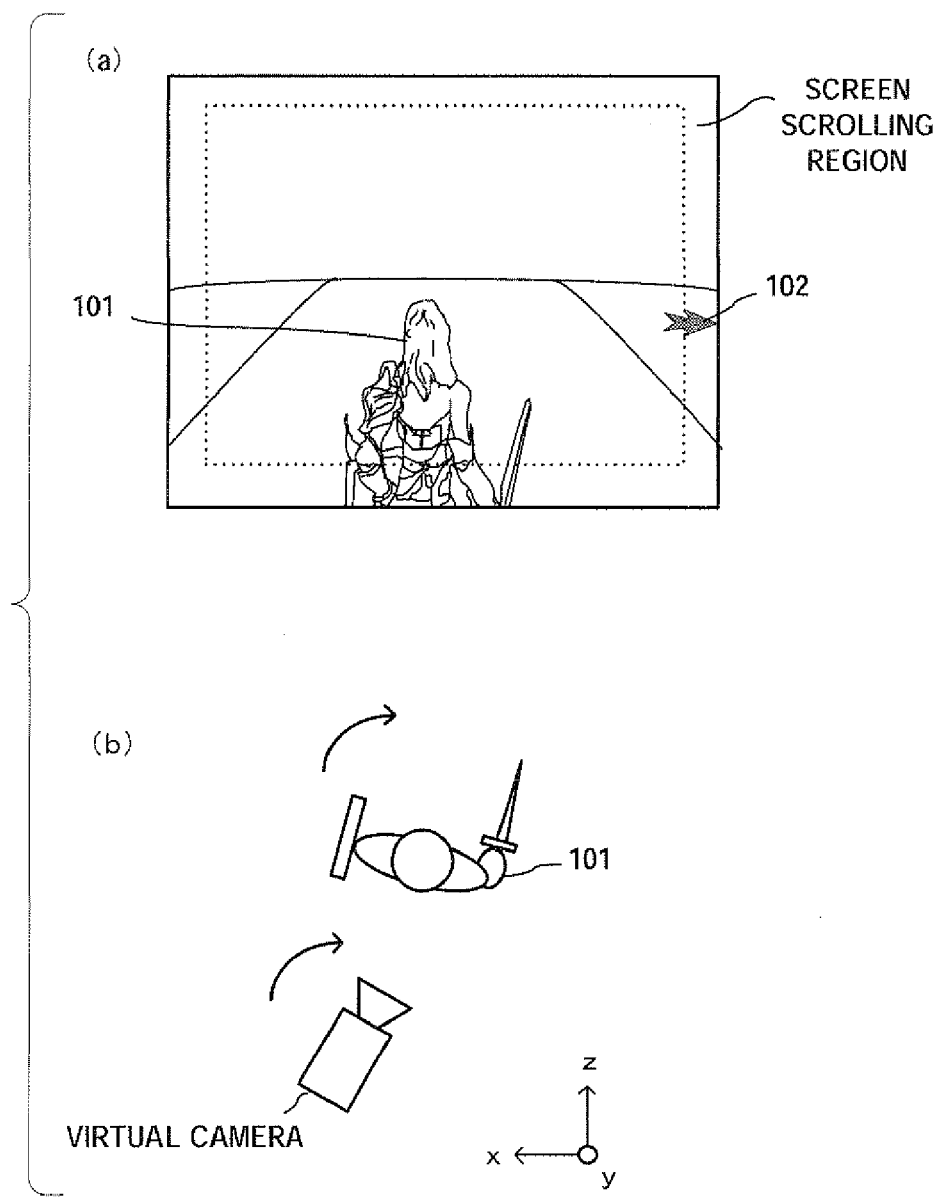
FIG. 13 is a view for explaining a screen scrolling operation.

The following will describe an operation in the present game. In the present game, as shown in FIG. 10, an operation for the player object 101 is performed in a state where an extended controller 36 is connected to the connector 73 of the controller 7. Here, the extended controller 36 includes an analog stick 39 capable of performing input in analog form. When playing the game, for example, as shown in FIG. 11, the player holds the controller 7 with a right hand and the extended controller 36 with a left hand. In this case, the player holds the controller 7 such that the front surface of the controller 7 (that is, a side having an entrance through which light is incident on the imaging information calculation section 74 taking an image of the light) held with the right hand faces the markers 8L and 8R. In this state, the player can perform a game operation by tilting the controller 7, changing a position in the screen to which the controller 7 points (a pointing position), or changing the distance between the controller 7 and each of the markers 8L and 8R. In the game of the present embodiment, an operation for moving the player object 101 is mainly performed with the extended controller 36 held with the left hand, and an operation for moving the cursor 102 and an operation for an attack with the sword object 104 is mainly performed with the controller 7 held with the right hand. Here, the present game is a sword-fighting game as described above, and an attack motion of the player object 101 is a motion of "cutting" the enemy object 103 with the sword object 104. Thus, hereinafter, an operation for an attack is referred to as a "cutting attack operation".

First, an operation for moving the player object 101 with the extended controller 36 will be described. When the player tilts the analog stick 39 of the extended controller 36, held with the left hand, in the upward direction, the player object 101 moves forward. When the player tilts the analog stick 39 in the downward direction, the player object 101 moves backward. When the player tilts the analog stick 39 in the rightward direction, the player object 101 moves horizontally rightward (moves rightward without changing the facing direction of the player object; e.g. a motion of rightward side stepping while facing forward). When the player tilts the analog stick 39 in the leftward direction, the player object 101 moves horizontally leftward.

Next, an operation with the controller 7 will be described. On the game screen, the cursor 102 is displayed at a position to which the controller 7 points (a pointing position). In the present embodiment, when the cursor 102 is moved at less than a predetermined speed, a normal cursor moving operation by which the cursor is simply displayed at a pointing position can be performed. When the cursor 102 is moved to within a predetermined region adjacent to the periphery of the screen (hereinafter, referred to as a screen scrolling region), the facing direction of the virtual camera is changed in accordance with the position of the cursor 102, and the screen can be scrolled. For example, when the cursor 102 is moved to the upper end of the screen (within the screen scrolling region) as shown in FIG. 12(a), the facing direction of the virtual camera becomes upward. In other words, the virtual camera rotates about x-axis. As a result, the view line direction of the virtual camera becomes upward such that the virtual camera looks up, and drawing is made in this state.

Similarly, for example, as shown in FIG. 13(a), when the cursor 102 is moved to the right end of the screen, the virtual camera also turns right as shown in FIG. 13(b) (rotates clockwise about y-axis). In this case, the player object 101 turns rightward, and change of direction is possible. For example, when the cursor 102 is moved to the right end of the screen and stays at the position, it is possible to turn right in the virtual game space.

On the other hand, when the cursor 102 is moved at the predetermined speed or faster, a cutting attack operation is possible. In other words, by quickly moving the cursor 102 so as to pass through the enemy object 103 (e.g. from left to right), it is possible to perform an intuitive operation of "cutting" the enemy object 103.

Figure 14:
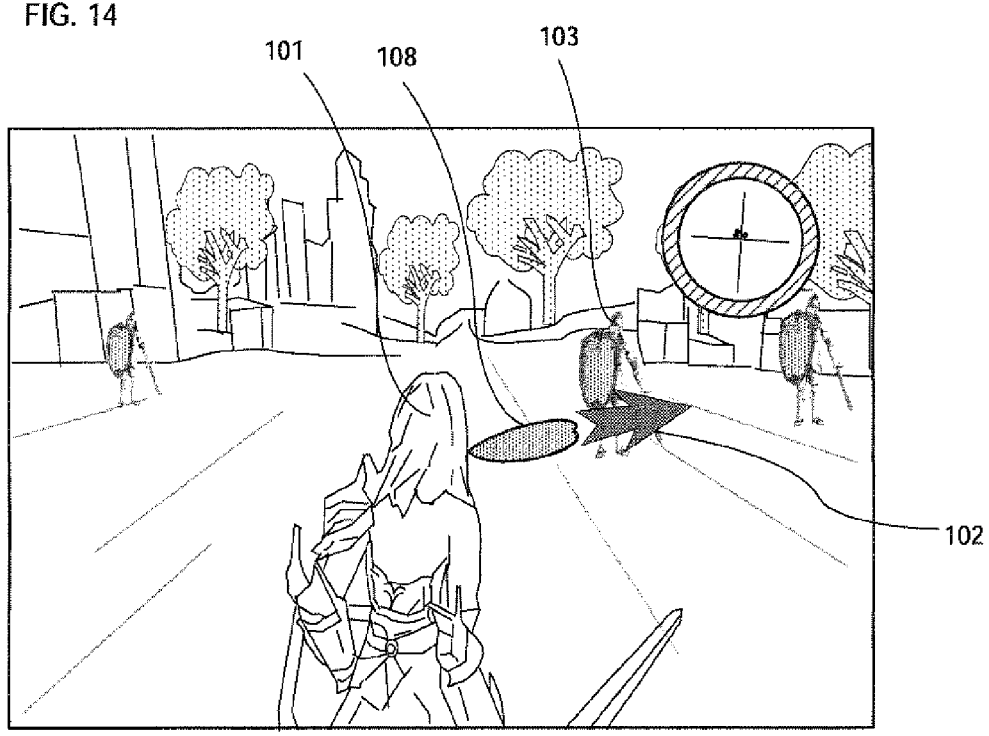
FIG. 14 is a view for explaining a screen scrolling operation.
Figure 15:
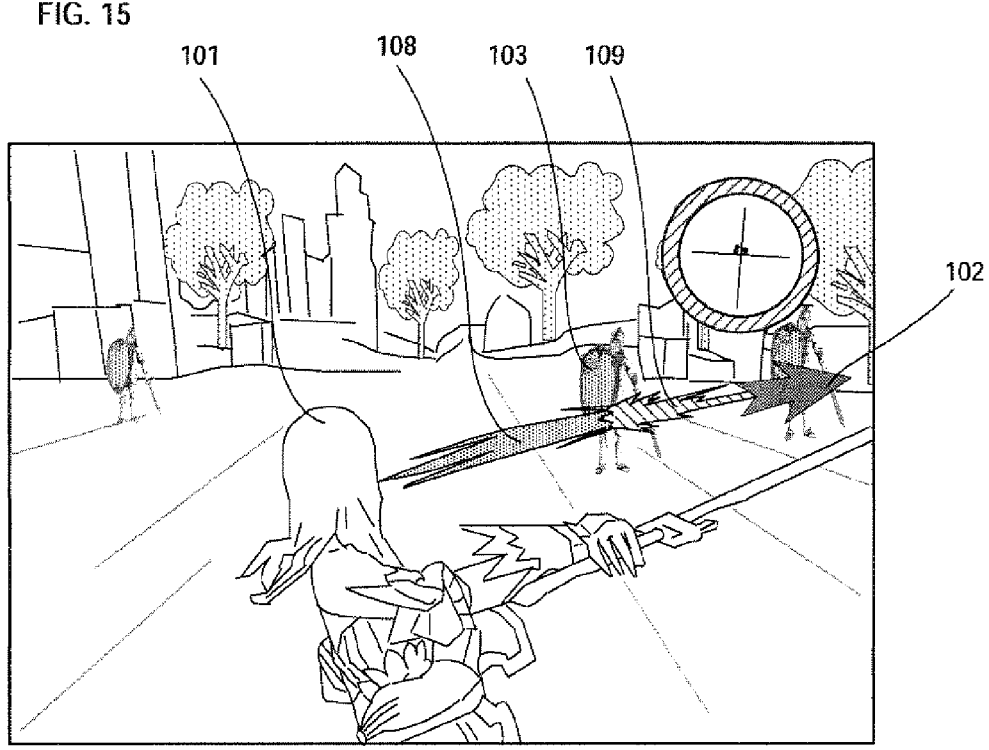
FIG. 15 is a view showing the example of the cutting attack operation.

The following will describe the cutting attack operation. As described above, when moving the cursor 102 at the predetermined speed or faster, a cutting attack operation is possible. FIGS. 14 and 15 show an example of a cutting attack operation. FIG. 14 shows a state immediately after the start of a cutting attack, in which the cursor 102 is being moved at the predetermined speed or faster. In FIG. 14, a cutting attack trajectory 108 indicative of a trajectory of the cutting attack starts to be displayed. FIG. 15 shows a state during the cutting attack, in which the cutting attack hits an enemy object 103. A hit effect 109 which is prepared in advance is drawn so as to be superimposed on a part of the cutting attack trajectory 108 which extends rightward from the position where the cutting attack hits the enemy object 103, thereby indicating that the cutting attack hits the enemy object 103.

The following will describe a principle of processing for a cutting attack operation (hereinafter, referred to merely as cutting attack processing). In the present embodiment, a change amount of the pointing position (the displayed position of the cursor 102) of the controller 7 (namely, a moving amount of the cursor 102) per a predetermined unit time, specifically, per one frame (1/60 sec.) is calculated. When the change amount is less than a predetermined value, processing regarding the above normal cursor moving operation or screen scrolling is executed. When the change amount is equal to or larger than the predetermined value, the cutting attack processing is executed.

FIGS. 16 to 23 are views for explaining the principle of the cutting attack processing, and show a shift of the pointing position per one frame. In these figures, black points indicate current pointing positions, and shaded points indicate pointing positions detected previously. Star signs indicate the start position of a cutting attack (hereinafter, referred to as a cutting attack start point), and triangles indicate the end position of the cutting attack (hereinafter, referred to as a cutting attack end point).

Figure 16:
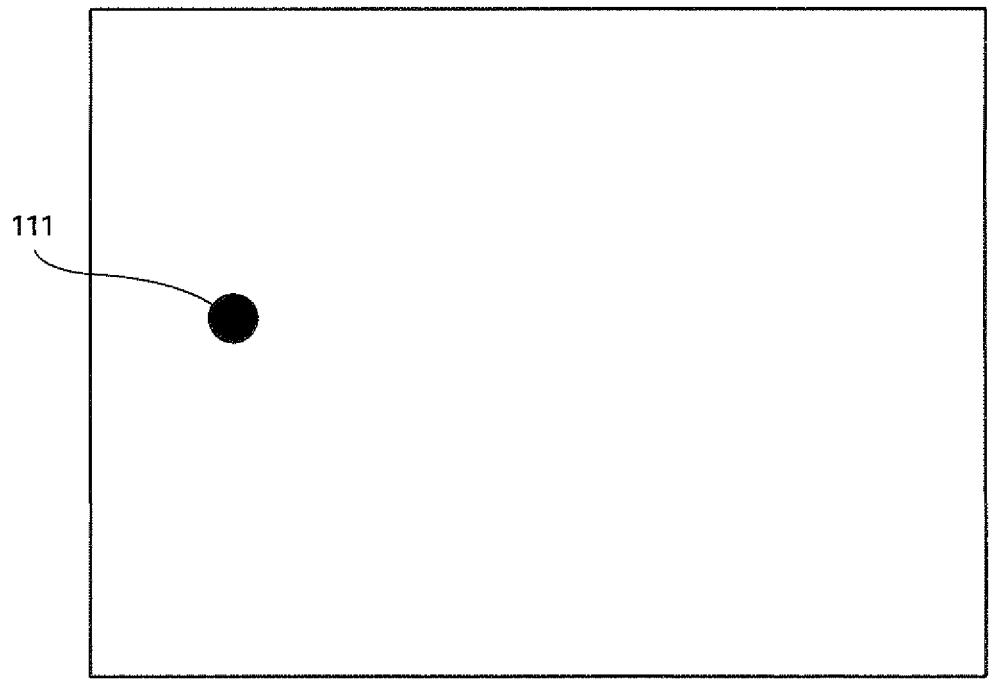
FIG. 16 is a view for explaining a principle of processing for a cutting attack operation.
Figure 17:
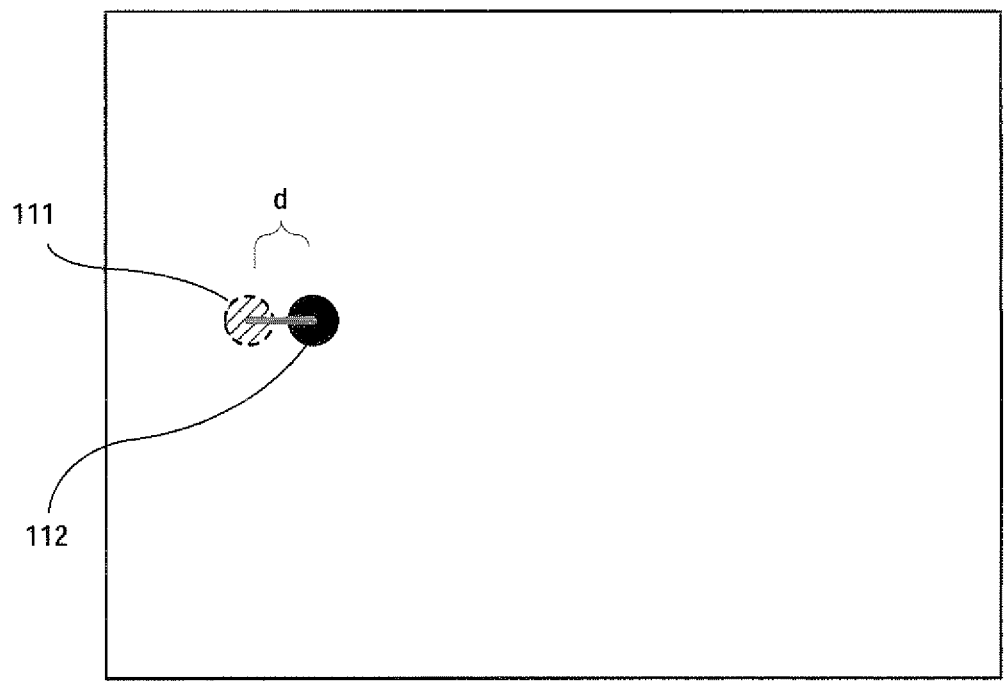
FIG. 17 is a view for explaining the principle of processing for a cutting attack operation.

As an initial state, a position indicated by a point 111 in FIG. 16 is pointed to. A state after one frame from this state is assumed to be a state shown in FIG. 17. In FIG. 17, a point 112 located at the current pointing position and the point 111 located at the pointing position at one frame before are shown. The change amount from the point 111 to the point 112, for example, a distance d (which can be calculated based on the coordinates of both pointing positions), is assumed to be less than a first predetermined value. In this case, the above processing of scrolling the screen is executed (in the example of FIG. 17, the virtual camera slightly rotates rightward).

Figure 18:
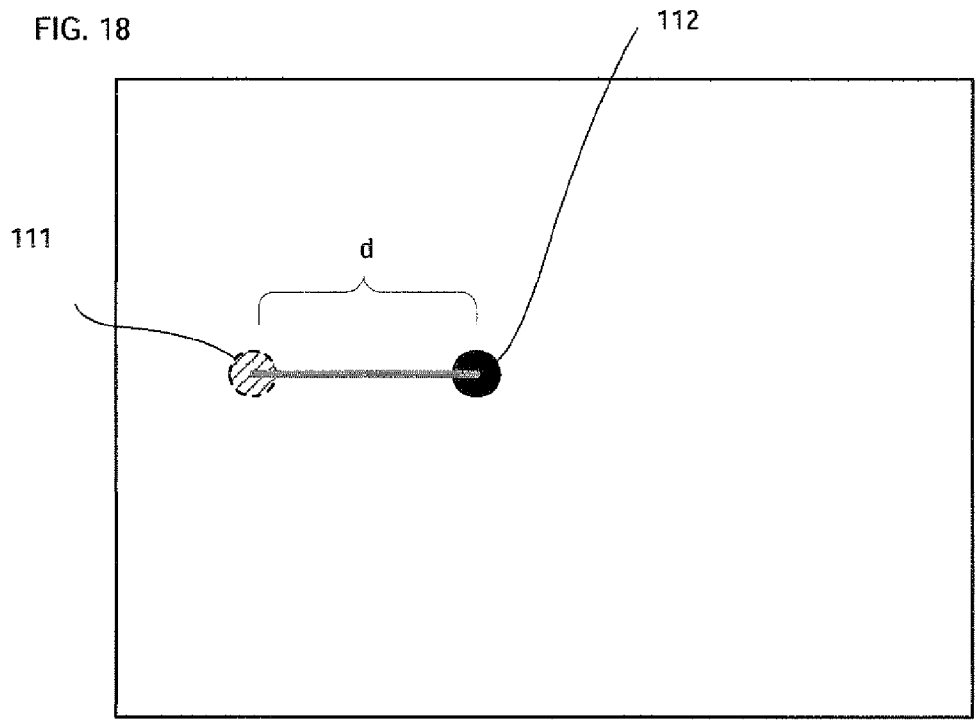
FIG. 18 is a view for explaining the principle of processing for a cutting attack operation.
Figure 19:
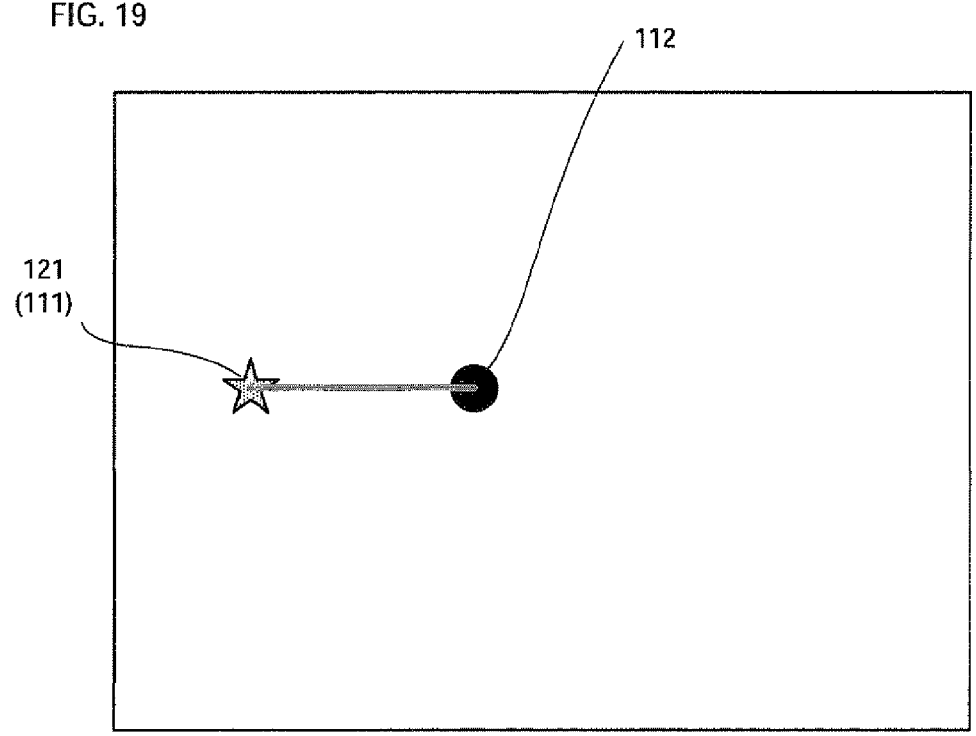
FIG. 19 is a view for explaining the principle of processing for a cutting attack operation.

On the other hand, the state after one frame from the state in FIG. 16 is assumed to be a state shown in FIG. 18. In FIG. 18, the distance d from the point 111 located at the pointing position at one frame before to a point 112 located at the current pointing position is assumed to be equal to or larger than the first predetermined value. In other words, a state where it is detected that the change amount is equal to or larger than the first predetermined value is assumed. In this case, the cutting attack processing is executed. In the cutting attack processing, the start point of a cutting attack is set. Specifically, the point 111 at one frame before is set as a cutting attack start point 121 as shown in FIG. 19. A trajectory from the cutting attack start point 121 to the point 112 is calculated, and drawing of a cutting attack trajectory and hit determinant processing for an enemy object 103 is executed based on the trajectory.

Figure 20:
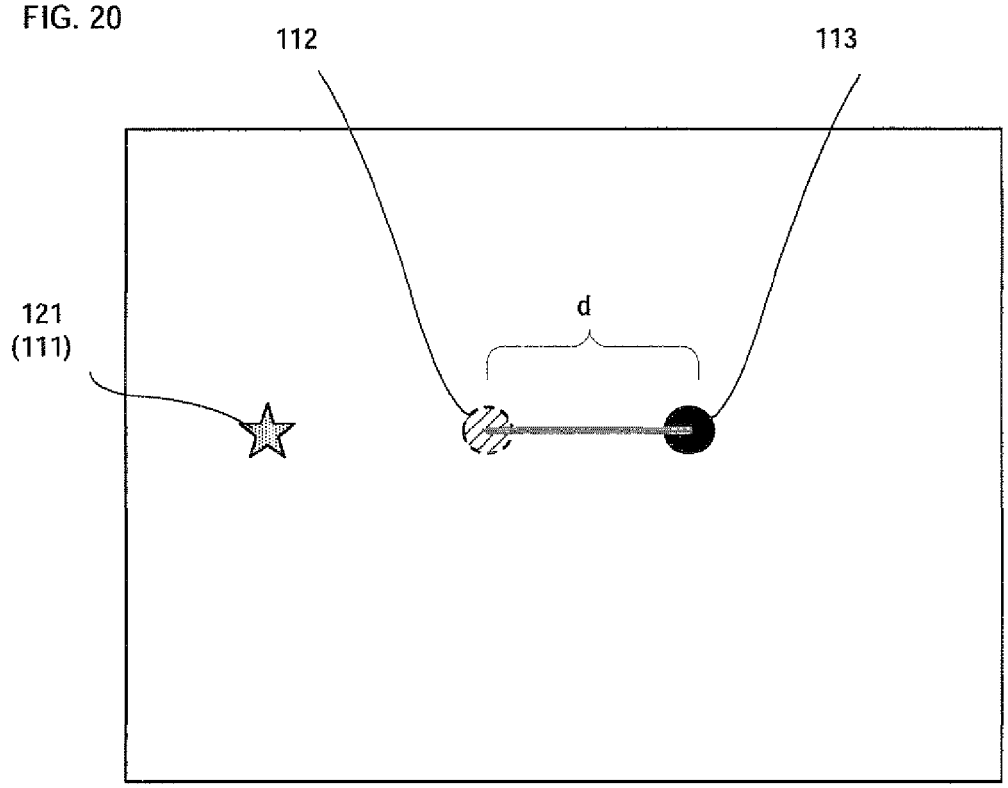
FIG. 20 is a view for explaining the principle of processing for a cutting attack operation.
Figure 21:
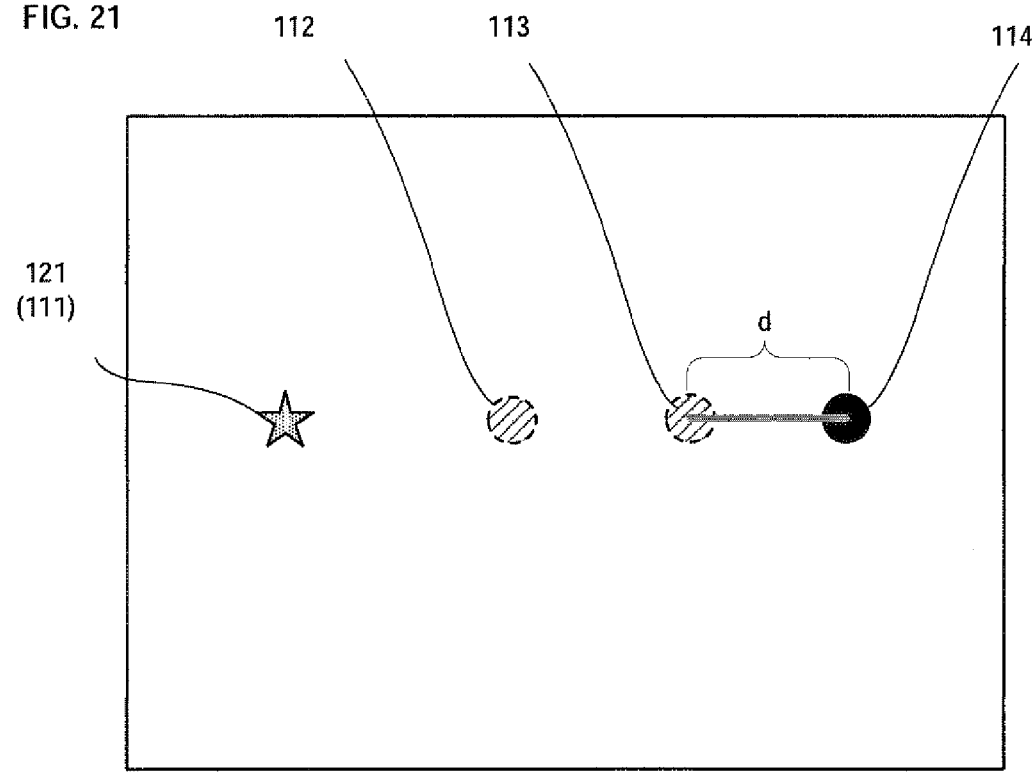
FIG. 21 is a view for explaining the principle of processing for a cutting attack operation.

Then, every one frame, the distance d between the current pointing position and the pointing position at one frame before is calculated, and as shown in FIGS. 20 and 21, the above drawing of the cutting attack trajectory and the hit determinant processing are continuously executed as long as the distance d is larger than a second predetermined value.

Figure 22:
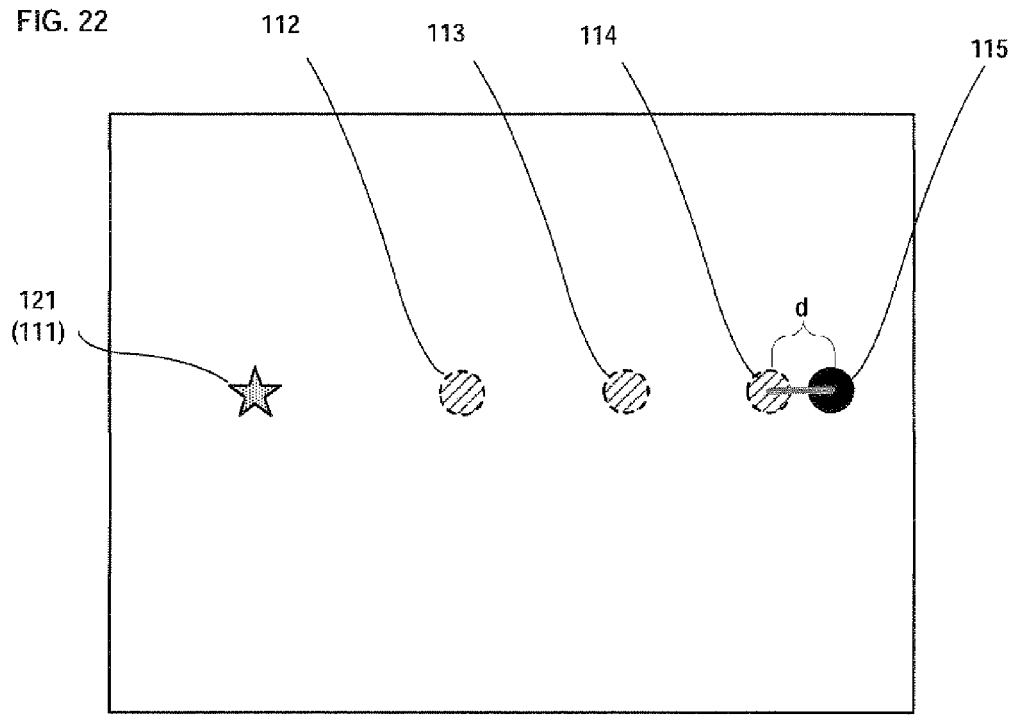
FIG. 22 is a view for explaining the principle of processing for a cutting attack operation.
Figure 23:
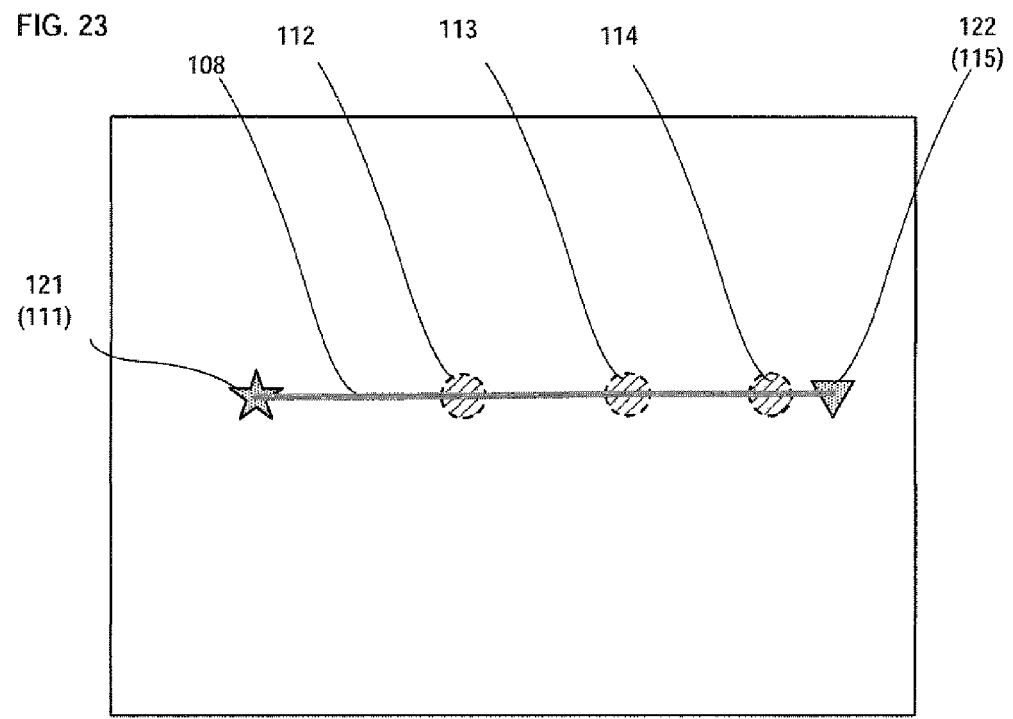
FIG. 23 is a view for explaining the principle of processing for a cutting attack operation.

Then, when the distance d between a point 115 located at the current pointing position and a point 114 located at the pointing position at one frame before becomes equal to or less than the second predetermined value after the cutting attack start point 121 is determined as shown in FIG. 22, the point 115 located at the current pointing position is set as a cutting attack end point 122 as shown in FIG. 23. As a result, the cutting attack trajectory 108 becomes a trajectory passing through the pointing positions detected from the cutting attack start point 121 to the cutting attack end point 122.

Figure 24:
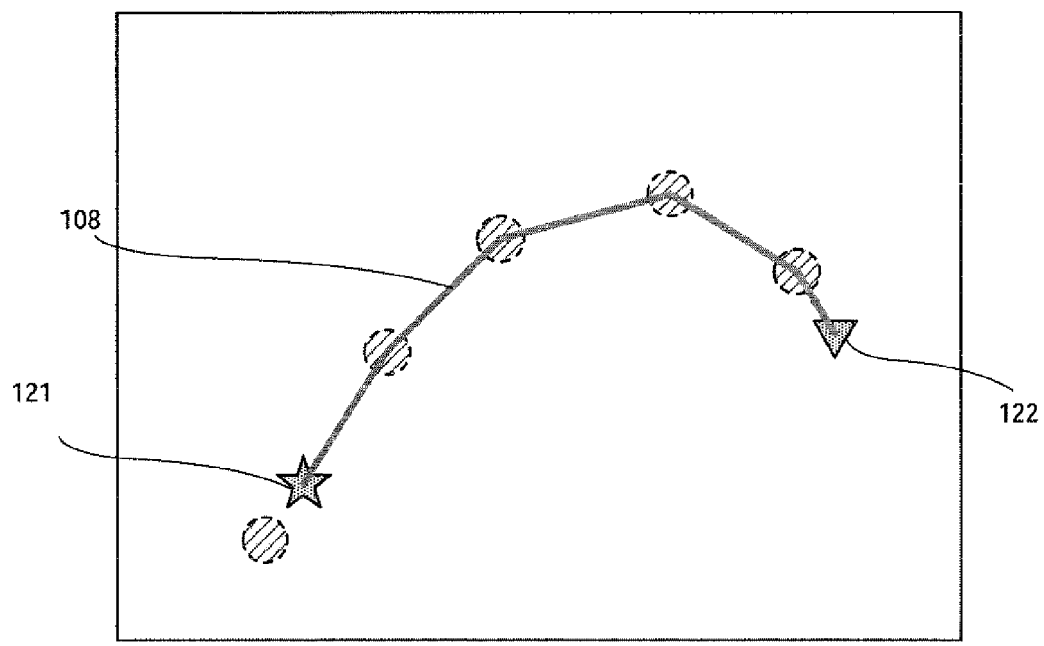
FIG. 24 is a view for explaining the principle of processing for a cutting attack operation.
Figure 25:
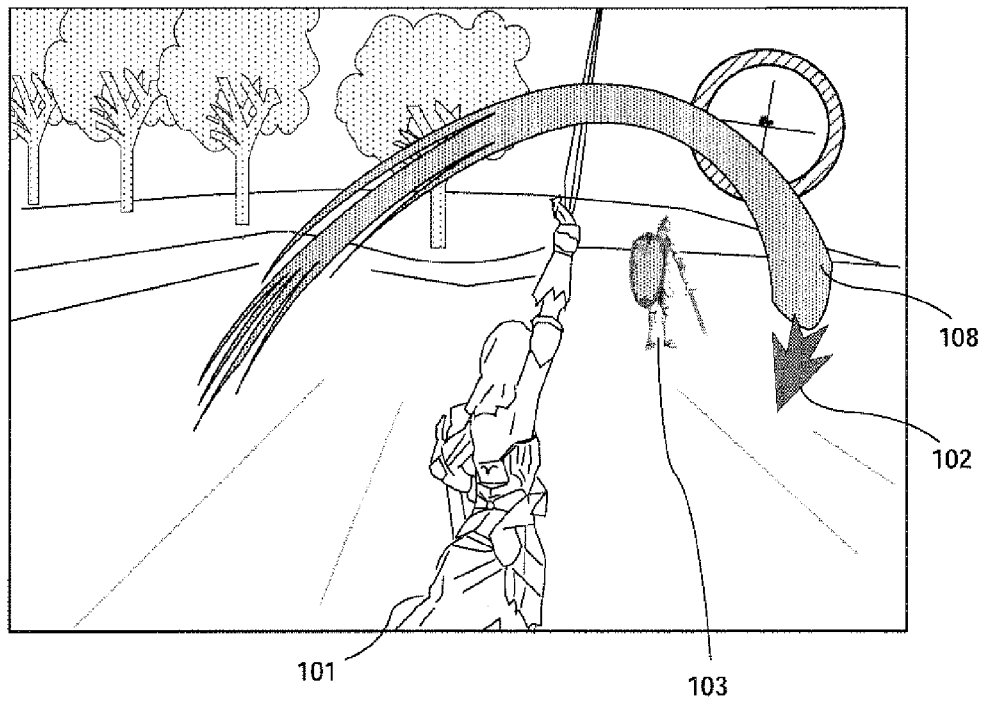
FIG. 25 shows an example of a game screen.

As described above, in the present embodiment, two types of operations, the normal cursor moving operation and the cutting attack operation, are selectively used depending on whether or not the change amount of the pointing position (the change amount of the displayed position of the cursor 102) per the predetermined unit time (per one frame) is equal to or larger than the first predetermined value. In the cutting attack operation, when it is detected that the change amount is equal to or larger than the first predetermined value, the pointing position at one frame before is set as a cutting attack start point. Then, when the change amount becomes equal to or less than the second predetermined value, a cutting attack end point is set. Thus, by moving the cursor 102 at a predetermined speed or faster, the trajectory can be a cutting attack trajectory 108. For that reason, in addition to the linear cutting attack trajectory 108 as in the example of FIG. 23, a curved cutting attack trajectory 108 shown in FIG. 24 is possible. In FIG. 24, the cutting attack trajectory 108 extends from bottom left in the upper right direction and further in the lower right direction. In the case of such a trajectory, a game screen is drawn as shown in FIG. 25 (In FIG. 25, the cutting attack trajectory 108 does not hit the enemy object 103, and a hit effect is not drawn). In other words, in addition to the manner of linear cutting, it is possible to cut any position, desired by the player, in the screen, thereby achieving an operation with a high degree of freedom.

Figure 26:
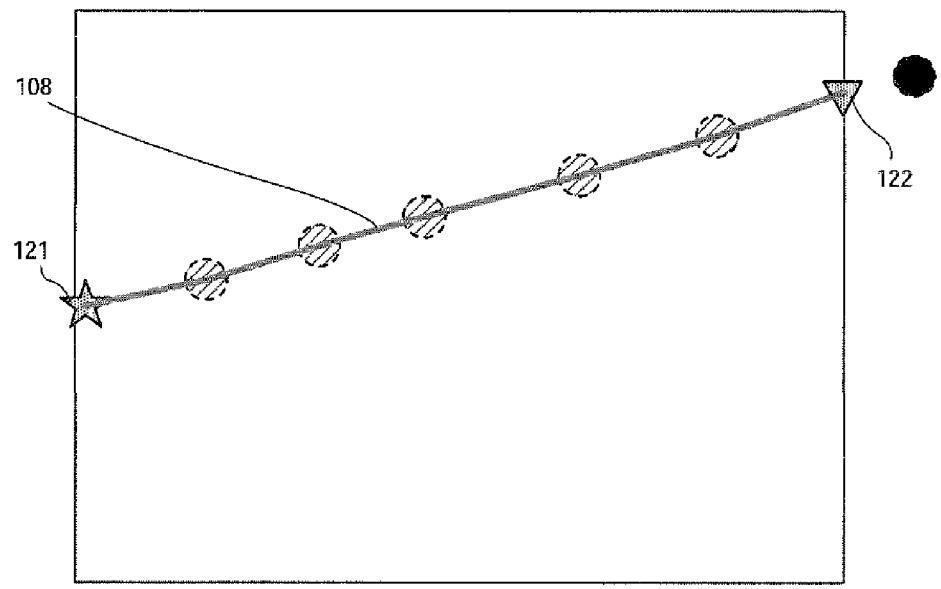
FIG. 26 is a view for explaining the principle of processing for a cutting attack operation.
Figure 27:
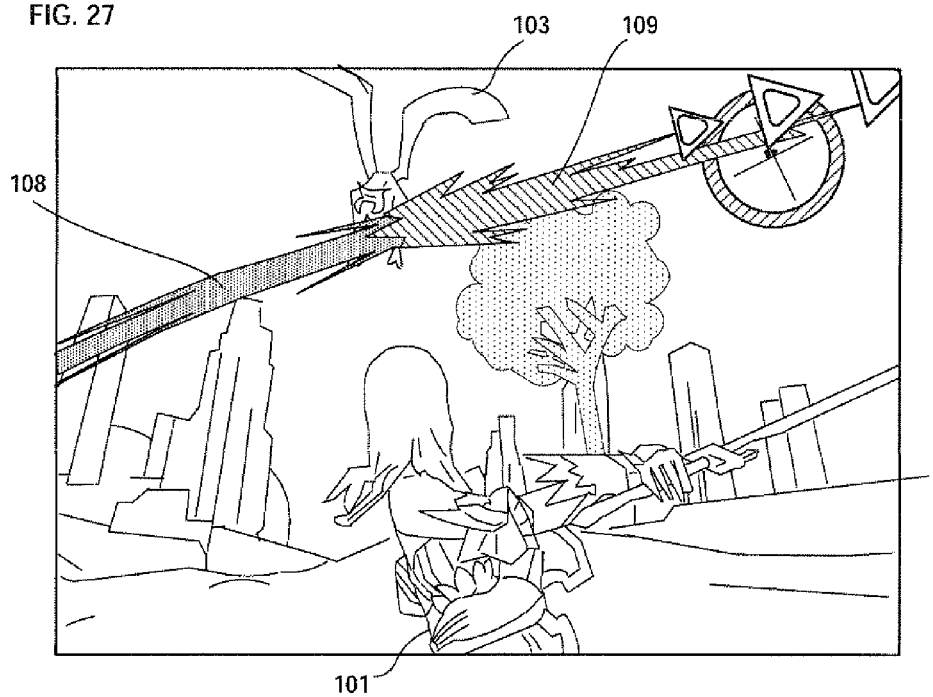
FIG. 27 shows an example of a game screen.

In the case where the pointing position is moved out of the screen after the cutting attack start point 121 is set, a cutting attack end point 122 is set when it is detected that the pointing position is out of the screen. For example, a position at the periphery of the screen is set as a cutting attack end point 122. FIG. 26 shows an example of a cutting attack trajectory 108 when the pointing position is moved out of the screen after the start of a cutting attack. FIG. 27 shows an example of a game screen in this case. In FIG. 27, because the pointing position is out of the screen (adjacent to the upper right corner of the screen), the cursor 102 is not displayed on the screen (instead, a plurality of triangles indicative of the moving direction of the cursor 102 is displayed in the upper right portion of the screen).

Figure 28:
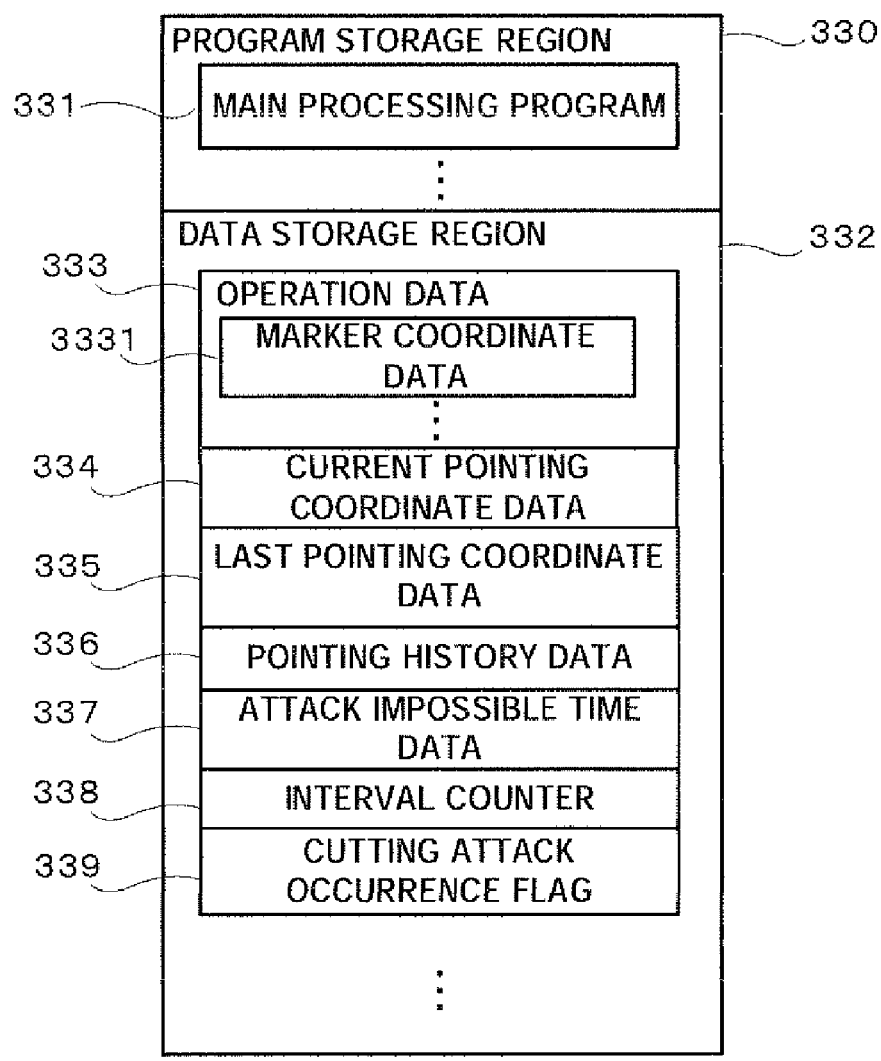
FIG. 28 is a view showing a memory map of a main memory 12 in a game apparatus main body 3.

The following will describe in detail the game processing executed by the game apparatus main body 3. First, data stored in the external main memory 12 during the game processing will be described. FIG. 28 is a view showing a memory map of the external main memory 12 in the game apparatus main body 3. As shown in FIG. 28, the external main memory 12 includes a program storage region 330 and a data storage region 332. A part of data in the program storage region 330 and the data storage region 332 is stored in the optical disc 4, and transferred to and stored in the external main memory 12 when executing the game program.

In the program storage region 330, programs, such as a main processing program 331 for executing a flow chart shown in later-described FIG. 29 and the like, are stored.

In the data storage region 332, data, such as operation data 333, current pointing coordinate data 334, last pointing coordinate data 335, pointing history data 336, attack impossible time data 337, an interval counter 338, and a cutting attack occurrence flag 339, are stored.

The operation data 333 is data obtained from the controller 7, and includes marker coordinate data 3331 indicative of the above marker coordinates (see FIG. 8). Here, when any one of the markers 8L and 8R does not appear in the taken image as shown in FIG. 8, a value indicative of this (e.g. a NULL value) is set. In addition, the operation data 333 includes data indicative of contents of operations by the player, such as data indicative of a state of pressing each button, acceleration data, data indicative of contents of an operation performed with respect to the extended controller 36 (an operation of the above analog stick 39, and the like).

The current pointing coordinate data 334 is data calculated based on the above marker coordinate data 3331 and indicative of a pointing coordinate of the controller 7. The last pointing coordinate data 335 is data calculated in processing at the last frame and indicative of a pointing coordinate.

The pointing history data 336 is data indicative of a history of pointing coordinates detected after the start of a cutting attack until the end of the cutting attack. The poi history data 336 is used for generating and drawing the above cutting attack trajectory 108.

The attack impossible time data 337 is data indicative of the length of an attack impossible time which is set after the end of a series of the cutting attack operation. The attack impossible time is a time which is provided in view of the contents of the present game for preventing successive cutting attacks from being performed by an operation of shaking the controller 7 quickly right and left by the player only using a wrist. In other words, after the end of one cutting attack, another cutting attack cannot be performed immediately.

The interval counter 338 is a counter for counting the elapse of the attack impossible time. As an initial value, "0" is set in the interval counter 338.

The cutting attack occurrence flag 339 is a flag for indicating whether or not it is during a cutting attack. If ON, the cutting attack occurrence flag 339 indicates that it is during a cutting attack, and if OFF, the cutting attack occurrence flag 339 indicates that a cutting attack is not occurring. The cutting attack occurrence flag 339 is initially set to be OFF.

Figure 29:
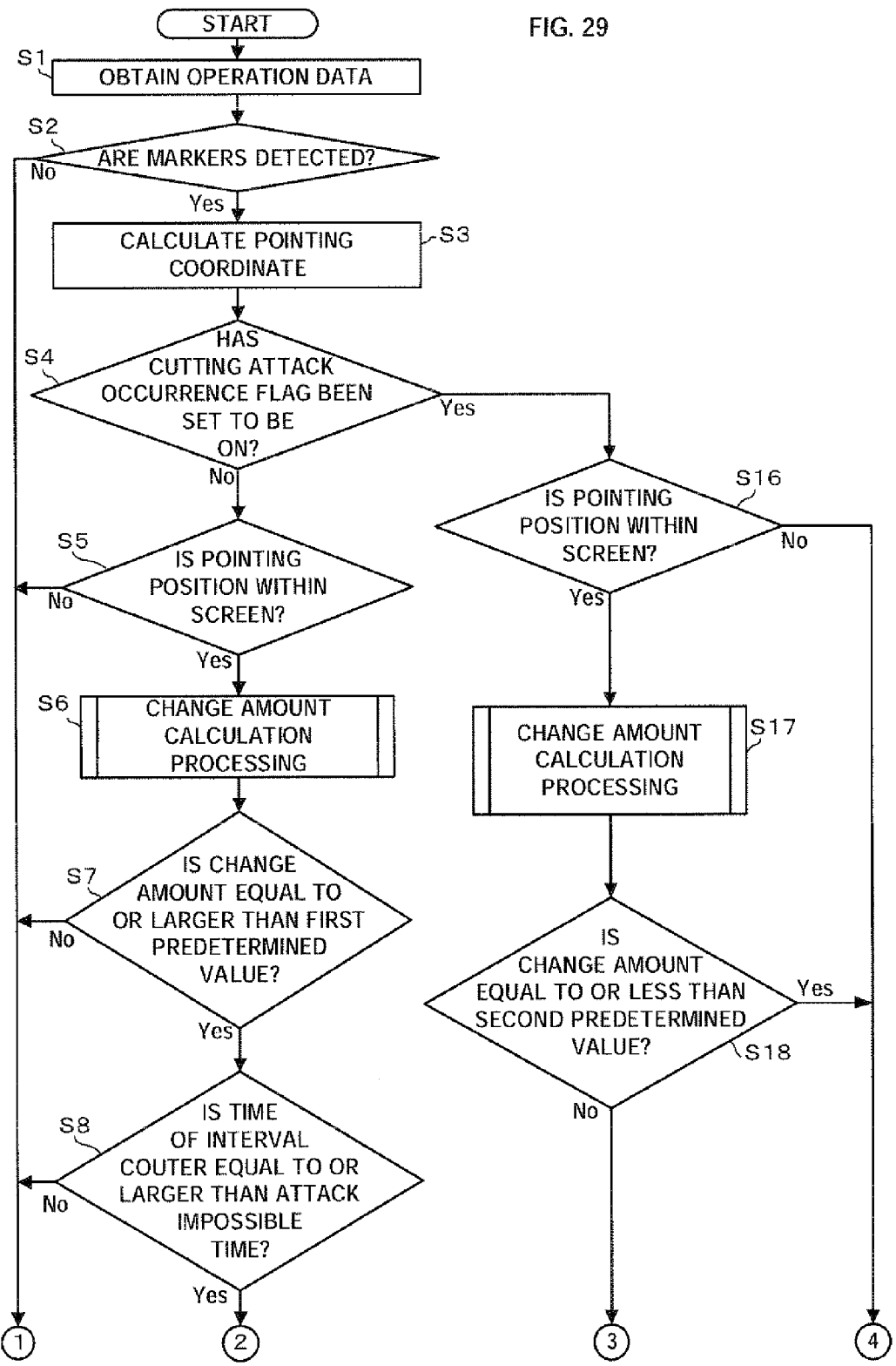
FIG. 29 is a flow char, showing game processing according to the present embodiment.
Figure 30:
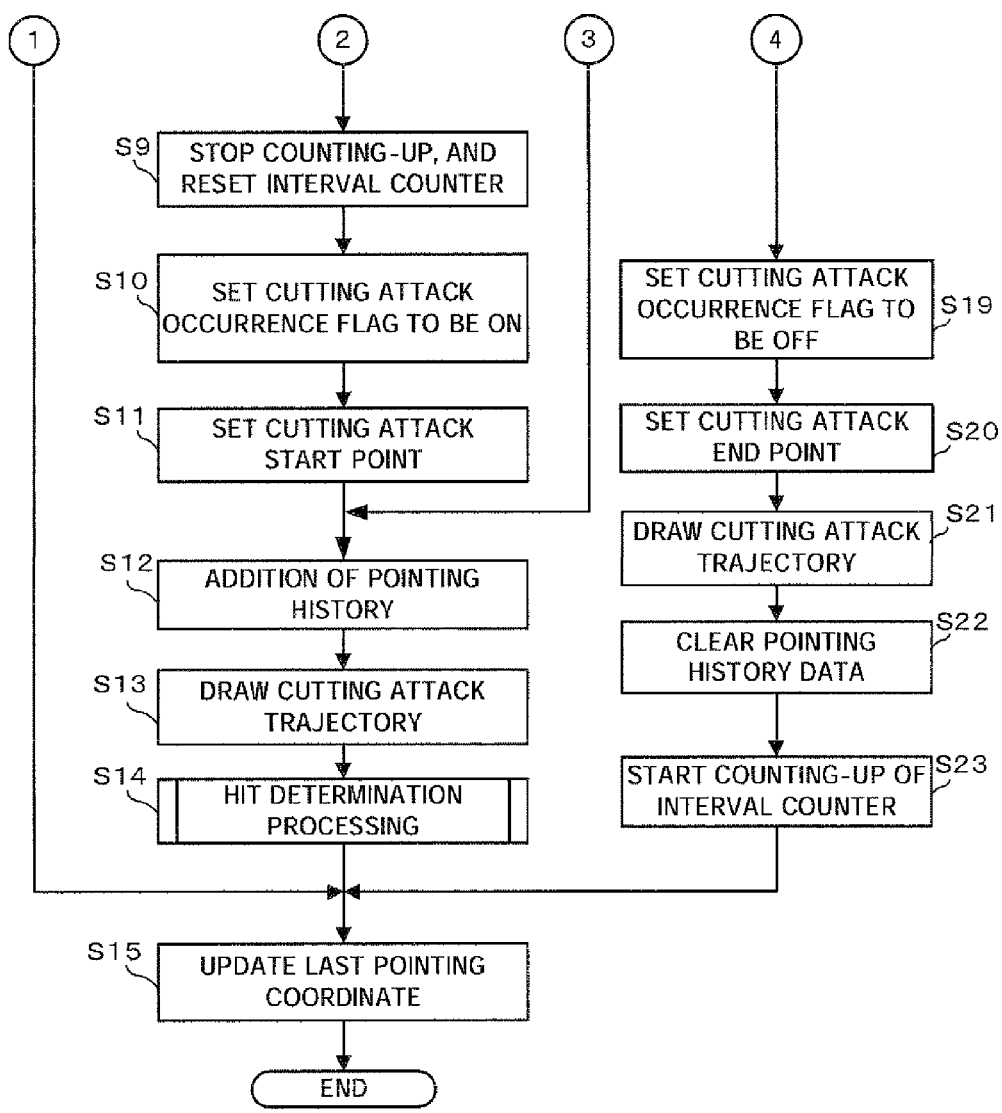
FIG. 30 is a flow chart showing the game processing according to the present embodiment.
Figure 31:
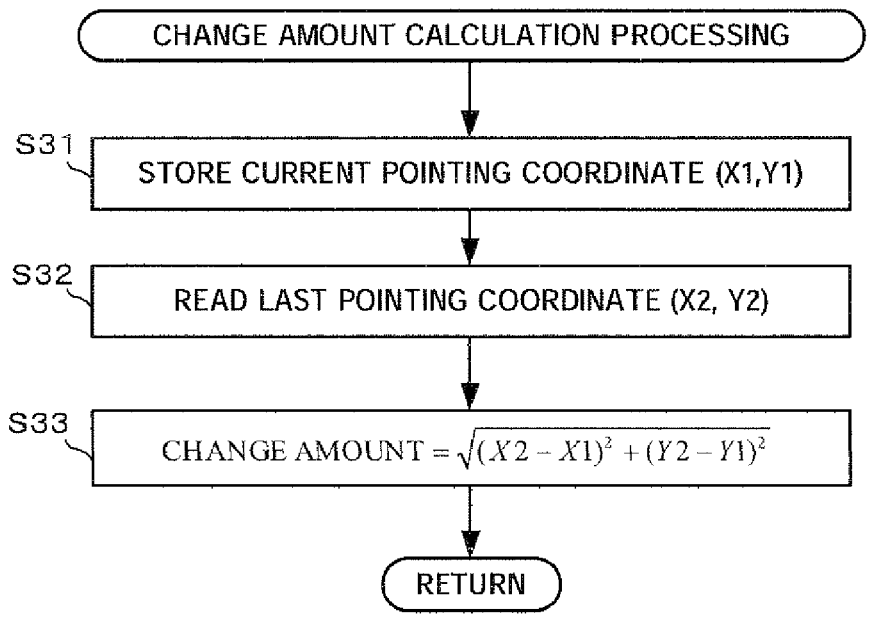
FIG. 31 is a flow chart showing a detailed operation in change amount calculation processing at steps S6 and S17 in FIG. 29.
Figure 32:
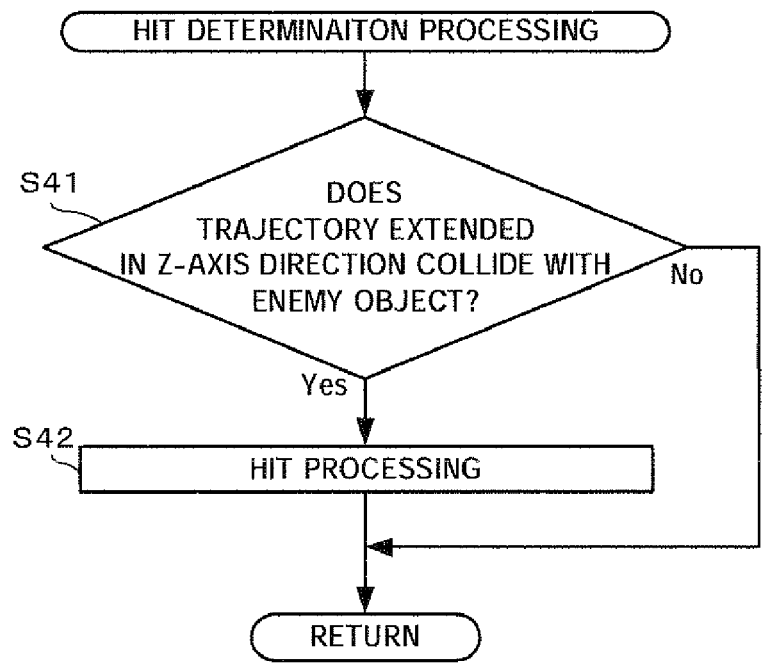
FIG. 32 is a flow chart showing a detailed operation in hit determination processing at a step S14 in FIG. 30.

The following will describe the game processing executed by the game apparatus main body 3 with reference to FIGS. 29 to 32. FIGS. 29 and 30 are flow charts showing the game processing executed by the game apparatus main body 3. FIG. 31 is a subroutine showing a detailed operation in change amount calculation processing in FIG. 29, and FIG. 32 is a subroutine showing a detailed operation in hit determination processing in FIG. 30. By repeating the processing in the flow charts of FIGS. 29 and 30 every one frame, the game advances. In the flow charts shown in FIGS. 29 and 30, among processing for the whole game, processing for the above cutting attack operation will be described, but other processing which are not directly relevant to the present invention will not be described in detail.

At a step S1, the marker coordinate data 3331 is obtained from the external main memory 12.

At the following step S2, whether or not the markers 8L and 8R is detected in a taken image by the controller 7 is determined. In other words, whether or not the controller 7 faces the television 2 is determined. Specifically, the CPU 10 determines whether or not the images of the markers 8L and 8R appear in the taken image as shown in FIG. 8. As described above, when any one of the markers 8L and 8R does not appear in the taken image, because a value (e.g. a NULL value) indicative of this is set in the marker coordinate data 3331, whether or not the controller 7 faces the television 2 can be determined by determining whether or not this value is set.

As the result of the determination at the step S2, when any one of the markers 8L and 8R is not detected (NO at the step S2), the processing proceeds to a later-described step S15. On the other hand, when both of the markers 8L and 8R are detected (YES at the step S2), a pointing position is calculated at a step S3.

The following will describe an example of a method for calculating a pointing coordinate. As described above, the marker coordinate data 3331 includes data indicative of the above marker coordinates. Because this data is indicative of two marker coordinates (see FIG. 8) corresponding to the markers 8L and 8R, the CPU 10 calculates the midpoint between the two marker coordinates. The position of the midpoint is represented by using the above xy coordinate system for representing a position in a plane corresponding to the taken image. Next, the CPU 10 converts the coordinate indicative of the position of the midpoint into a coordinate in a coordinate system (referred to as an x'y' coordinate system) for representing a position in the screen of the television 2. This conversion can be performed by using a function for converting the coordinate of the midpoint calculated from the taken image into a coordinate in the screen corresponding to the actual pointing position of the controller 7 when the taken image is taken. In this case, because the pointing position of the controller 7 is moved in a direction reverse to the positions of the marker coordinates in the taken image, the conversion is performed such that right and left and up and down are inverted. The coordinate represented by x'-y' coordinate values calculated thus is the pointing coordinate of the controller 7.

Subsequent to the processing of calculating the pointing coordinate, at a step S4, whether or not the cutting attack occurrence flag 339 has been set to be ON is determined. As the result of the determination, when the cutting attack occurrence flag 339 has been set to be ON (YES at the step S4), because a cutting attack has been already started, the processing proceeds to the later-described step S15.

On the other hand, when the cutting attack occurrence flag 339 has been set to be OFF (NO at the step S4), whether or not the pointing position is within the screen is determined at the following step S5. This determination is made on the assumption of the case where the controller 7 faces the television 2 (markers 8L and 8R) and the markers 8L and 8R appear in the taken image but the controller 7 does not point to the screen, such as the case where the controller 7 points to the outer frame of the television 2. Here, whether or not the pointing coordinate obtained by converting the marker coordinate at the step S3 has a value within a predetermined range defined in advance as "out-of-screen coordinate" (e.g. a region surrounding the outer periphery of the screen is defined in advance as this predetermined range) is determined.

As the result of the determination at the step S5, when the pointing position is not within the screen (NO at the step S5), the processing proceeds to the later-described step S15. On the other hand, when the pointing position is within the screen (YES at the step S5), next, at a step S6, the change amount calculation processing of calculating the change amount of the pointing position from the last frame to the current frame is executed. FIG. 31 is a flow chart showing a detailed operation in the change amount calculation processing at the step S6. As shown in FIG. 31, at a step S31, the pointing coordinate obtained at the step S3 is stored in the current pointing coordinate data 334.

At the following step S32, the last pointing coordinate data 335 is read from the external main memory 12.

Then, at a step S33, the change amount is calculated based on coordinates (hereinafter, referred to as a current pointing coordinate and a last pointing coordinate, respectively) indicated by these two pointing coordinate data. Specifically, where the current pointing coordinate and the last pointing coordinate are represented by (X1,Y1) and (X2,Y2), respectively, the change amount C is calculated by the following formula:

$$C=\sqrt{(X2-X1)^2+(Y2-Y1)^2}.$$

This is the end of the change amount calculation processing.

Referring back to FIG. 29, next, at a step S7, whether or not the calculated change amount C is equal to or larger than a first predetermined value is determined. In other words, whether the player moves the cursor 102 quickly or slowly is determined. As the result of the determination, when the change amount C is less than the first predetermined value (NO at the step S7), the processing proceeds to the later-descried step S15.

On the other hand, when the change amount C is equal to or larger than the first predetermined value (YES at the step S7), whether or not an elapsed time indicated by the interval counter 338 is equal to or larger than the attack impossible time indicated by the attack impossible time data 337 is determined at the following step S8. When the elapsed time indicated by the interval counter 338 is less than the attack impossible time indicated (NO at the step S8), the processing proceeds to the later-descried step S15.

On the other hand, when the elapsed time indicated by the interval counter 338 is equal to or larger than the attack impossible time indicated by the attack impossible time data 337 (YES at the step S8), counting-up of the interval counter 338 is stopped at the following step S9 (it is noted that the counting is started in later-described processing at a step S23). Further, the interval counter 338 is reset.

Next, at a step S10, the cutting attack occurrence flag 339 is set to be ON. At the following step S11, the last pointing coordinate is set as a cutting attack start point 121 (see FIG. 19).

Next, at a step S12, the pointing coordinate calculated at the step S3 is added to the pointing history data 336.

Next, at a step S13, the pointing history data 336 is referred to, and a cutting attack trajectory 108 connecting the cutting attack start point 121 and the current pointing coordinate is calculated. Then, drawing of the cutting attack trajectory 108 is executed. In addition, the cursor 102 is drawn at the position in the screen which is indicated by the current pointing coordinate.

Next, at a step S14, the hit determination processing is executed for determining whether or not the cutting attack hits an enemy object 103. FIG. 32 is a flow chart showing in detail the hit determination processing at the step S14. As shown in FIG. 32, at a step S41, a trajectory obtained by extending the cutting attack trajectory in the depth direction (in the z-axis positive direction) is calculated, and whether or not this trajectory collides with an enemy object 103 is determined. As the result of the determination, when the trajectory does not collide with any enemy object 103 (NO at the step S41), the hit determination processing ends.

On the other hand, when the trajectory collides with an enemy object 103 (YES at the step S41), hit processing is executed at the following step S42. In the hit processing, processing for damaging the collided enemy object 103 and processing of drawing a hit effect (see the hit effect 109 in FIG. 15) so as to be superimposed on a part of the cutting attack trajectory which extends from a position where the cutting attack hits the enemy object 103 are executed. In addition to the above drawing of the hit effect so as to be superimposed, a hit effect may be provided by changing the color of the part of the cutting attack trajectory which extends from the position where the cutting attack hits the enemy object 103. This is the end of the hit determination processing.

At the following step S15, processing of updating the last pointing coordinate data 335 with the values of the current pointing coordinate data 334 is executed. When the pointing coordinate represents a position out of the screen (NO at the step S2 or S5), a value indicating that the pointing coordinate represents the position out of the screen is set in the last pointing coordinate data 335. Then, the game processing ends.

Next, processing when the cutting attack occurrence flag 339 has been set to be ON as the result of the determination at the step S4 (YES at the step S4) will be described. In other words, processing after the cutting attack is started will be described. In this case, at a step S16, whether or not the pointing position is within the screen is determined. The processing at the step S16 is the same as that at the step S5. As the result of the determination, when the pointing position is not within the screen (NO at the step S16), the processing proceeds to a later-described step S19. On the other hand, when the pointing position is within the screen (YES at the step S16), the change amount calculation processing is executed at a step S17. The processing at the step S17 is the same as that at the step S6, and thus the description thereof will be omitted.

Next, at a step S18, whether or not a change amount C calculated at the step S17 is equal to or less than a second predetermined value is determined. In other words, after the cutting attack is started by the movement of the cursor at a predetermined speed or faster, whether or not the movement speed of the cursor becomes equal to or less than a predetermined speed is determined. As the result of the determination, when the change amount C is not equal to or less than the second predetermined value (NO at the step S18), it means that the cutting attack continues, and thus the processing proceeds to the step S12 and addition of a pointing history, drawing of the cutting attack trajectory 108, and the like are executed.

On the other hand, when the change amount C becomes equal to or less than the second predetermined value (YES at the step S18), the following processing is executed to end the cutting attack. At the step S19, the cutting attack occurrence flag 339 is set to be OFF. Next, at a step S20, the current pointing coordinate is set as a cutting attack end point 122. At this time, when the pointing position is out of the screen (when NO at the step S16), the CPU 10 calculates a trajectory obtained by extending a trajectory, which connects the last pointing coordinate and a pointing coordinate detected immediately prior to the detection of the last pointing coordinate, to the periphery of the screen, and sets a coordinate at a position where the calculated trajectory intersects with the periphery of the screen as a cutting attack end point 122.

Next, at step S21, by executing the same processing as at the step S13, a cutting attack trajectory connecting the cutting attack start point 121 and the current pointing coordinate 122 is drawn.

At the following step S22, the pointing history data 336 is cleared. Further, at a step S23, counting-up of the interval counter 338 is started. Then, the processing proceeds to the step S15. This is the end of the game processing according to the present embodiment.

As described above, in the present embodiment, when a change amount of the pointing position per one frame is larger than a predetermined value, in other words, when the cursor is moved at a predetermined speed or faster, a cutting attack having the pointing position at that time as a start point is started. Then, when the movement speed of the cursor becomes equal to or less than a predetermined value, the pointing position at that time is set as an end point: of the cutting attack, and the cutting attack is ended. Thus, in a game system which detects a pointing position based on an image pickup device and markers 8L and 8R, it is possible to execute different processing when an operation is performed to move the cursor slowly or quickly. Further, a pointing position when moving the cursor at the predetermined speed or faster is set as a start point, and processing can be executed. As a result, it is possible to perform an operation with a higher degree of freedom, thereby providing a new way of enjoyment to the player.

In the above embodiment, a change amount of the pointing position is calculated per one frame (1/60 sec.) which is an interval of drawing the screen. However, the present invention is not limited thereto, and, for example, the change amount may be calculated per 5 ms (1/200 sec.) which is a transmission interval of operation data from the controller 7 to the game apparatus main body 3. Operation data for one frame which is transmitted from the controller 7 may be stored in a predetermined buffer, and the change amount calculation processing at the steps S6 and S17 may be repeatedly executed for the data stored in the buffer. Further, not based on a change amount from a pointing position at one frame before (last pointing coordinate) as described above, based on a change amount of the pointing position obtained from the operation data for one frame, the processing at the steps S7 and S18 may be executed.

Further, a plurality of types of weapons to be held by the player object may be set, and the reach of an attack in the depth direction (the range of a weapon) may be individually set for each weapon in the hit determination processing. In this case, "weapon data" indicative of a plurality of types of weapons is defined, and data of "range" is defined in advance in each "weapon data". For example, a "double-handed sword" is defined so as to have a longer range than that of a "one-handed sword". In other words, the definition is made such that an attack with the "double-handed sword" reaches a more distant enemy object (namely, the double-handed sword has a longer blade than that of the one-handed sword). Then, in the hit determination processing at the step S14, the "range" is read from the "weapon data" of the currently used weapon, a trajectory of the cutting attack is extended in the virtual game space for a distance according to the "range", and the determination of collision with an enemy object 103 may be determined. As described above, by using a parameter which is the "range", each weapon can have a characteristic when a plurality of weapons are used in the game, thereby enhancing the fun of the game.

Figure 33:
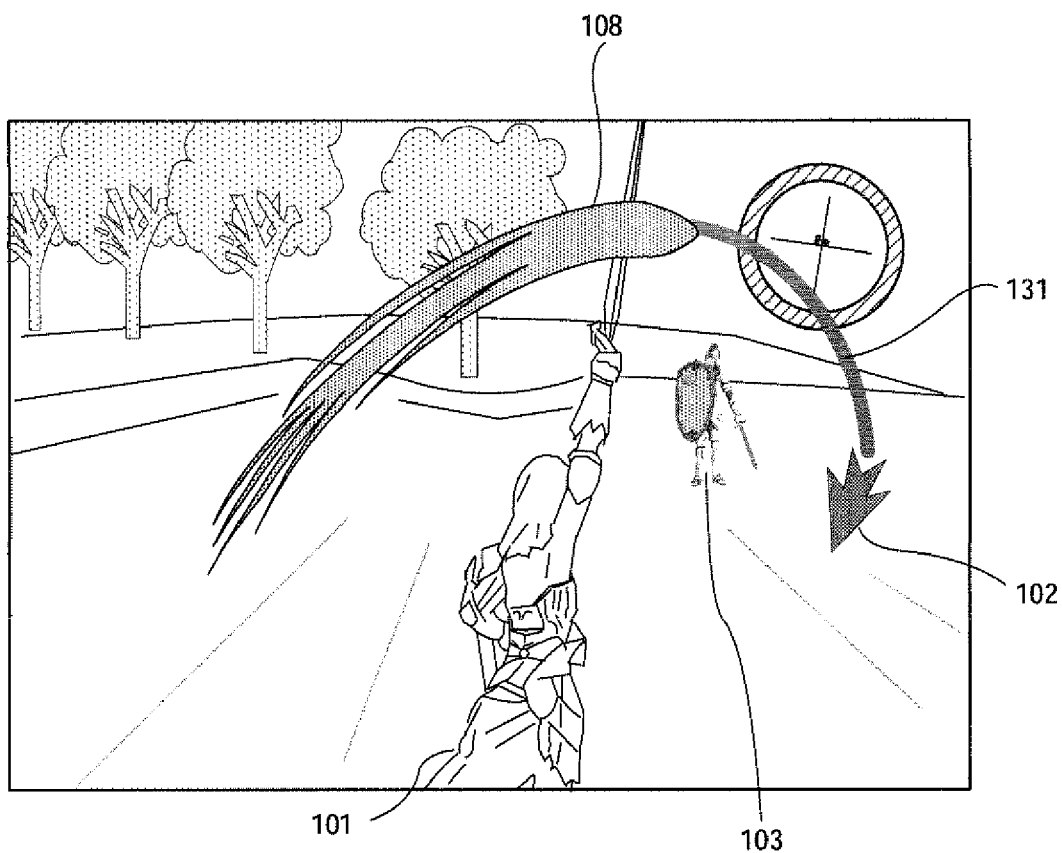
FIG. 33 shows an example of a game screen.

Further, regarding drawing of a cutting attack trajectory 108, a movement trajectory of the cursor 102 may be displayed prior to drawing of the cutting attack trajectory 108. For example, as shown in FIG. 33, a movement trajectory 131 of the cursor 102 may be drawn prior to the cutting attack trajectory 108, and the cutting attack trajectory 108 may be drawn after several frames (drawing is made such that the cutting attack trajectory 108 traces the movement trajectory 131). Thus, in the case where a plurality of types of weapons are set as described above, when the player object 101 uses a heavy weapon which takes time to swing around, the heaviness of the weapon can be expressed, thereby enhancing the fun of the game. In addition, it can be made easy for the player to know what trajectory is drawn.

Further, "penetrating power" indicative of the "sharpness" of a weapon may be set as a parameter of the weapon data, and processing based on this parameter may be executed. For example, when a plurality of enemy objects 103 align along the cutting attack trajectory 108, processing may be executed such that only one enemy object 103 is cut by a single cutting attack with a weapon having a low penetrating power (a blunt weapon) (the above hit processing is executed only for the one enemy object 103), but the plurality of enemy objects 103 aligning along the cutting attack trajectory 108 are cut by a single cutting attack with a weapon having a high penetrating power (a sharp weapon) (the above hit processing is executed for each of the enemy objects 103 aligning along the cutting attack trajectory 108). More specifically, as the "penetrating power" parameter, a "distance (pixel number) from a position where a cutting attack initially hits an enemy object 103 to a position where the cutting attack can reach" is set. For example, when a value of "100" is set as the "penetrating power" parameter, processing is executed such that a cutting attack continues (a cutting attack trajectory is drawn) for a distance equivalent to 100 pixels from a position in the screen where the cutting attack initially hits an enemy object 103 (a position obtained by converting the position of the enemy object 103 initially hit by the cutting attack in the virtual space from a three-dimensional coordinate system to a two-dimensional coordinate system (screen coordinate system) and any number of enemy objects 103 are cut within the distance (however, when enemy objects 103 align in the depth direction, the hit processing is executed for the nearest enemy object 103). Thus, by setting the "penetrating power" as a "distance for which a cutting attack continues (pixel number)", each weapon can have a characteristic when a plurality of weapons are used in the game, thereby enhancing the fun of the game. Further, for example, by making a large enemy object with an overall length of 30 m appear in the virtual space, and by setting a plurality of hit points in the large enemy object (the hit processing can be executed a plurality of times for the single large enemy object), each enemy object 103 can have a character', thereby enhancing the fun of the game.

Figure 34:
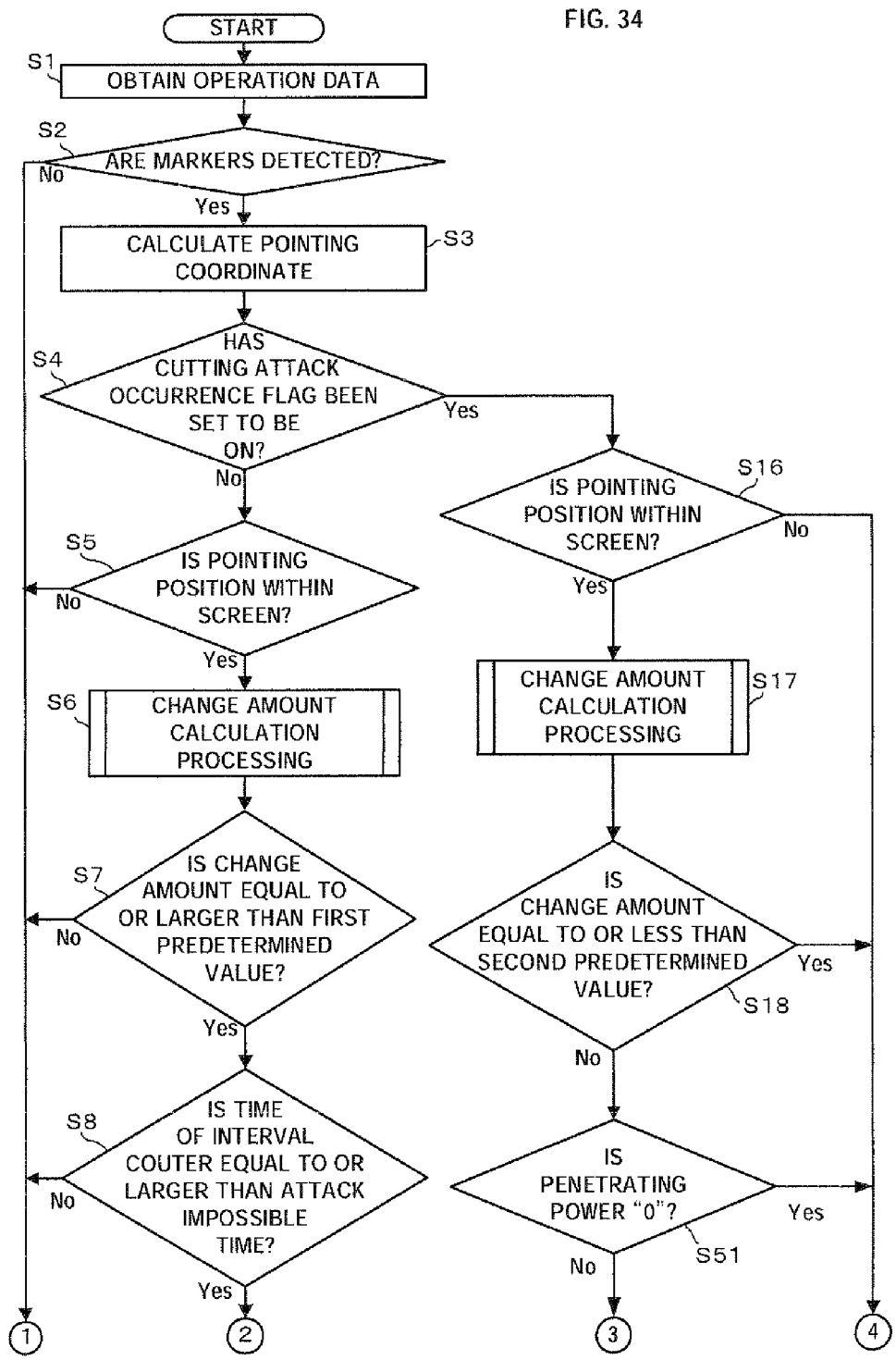
FIG. 34 is a flow chart showing game processing in the case of using a penetrating power parameter.

Further, as the "penetrating power" parameter, a number of times of attacks in a single cutting attack may be set. For example, a value of "5" is set (it indicates that it is possible to attack five enemy objects 103 with a single cutting attack), and in the case where there are a plurality of enemy objects 103 aligning along the cutting attack trajectory 108, "1" is subtracted from the "penetrating power" parameter every time the cutting attack hits an enemy object 103 (e.g. in the processing at the step S42), and processing for ending the cutting attack (i.e. processing when the determination is made as NO at the step S18) may be executed when the "penetrating power" parameter becomes "0". For example, as shown in FIG. 34, after the determination is made as YES at the step S18, at a step S51, whether or not the "penetrating power" parameter is "0" is determined. When it is determined that the "penetrating power" parameter is not "0" (NO at the step S51), the processing proceeds to the step S12, and when it is determined that the "penetrating power" parameter is "0" (YES at the step S51; i.e. when the above change amount C does not become equal to or less than the second predetermined value but the "penetrating power" parameter becomes "0"), the processing proceeds to the step S19. In addition, a subtraction value for the "penetrating power" parameter may be changed depending on the type of an enemy object 103 and a "defensive strength" parameter set in advance for each enemy object 103. For example, when a cutting attack hits an unarmored enemy A, "1" may be subtracted from the "penetrating power" parameter, and when a cutting attack hits an armored enemy B, "3" may be subtracted from the "penetrating power" parameter. By doing so, each enemy object 103 can have a characteristic, thereby enhancing the fun of the game.

Further, in the above embodiment, a cutting attack with the sword object 104 has been described as one example of an attack manner. However, the present invention is not limited thereto, and a striking weapon such as a staff object may be used instead of the sword object 104. In this case, similarly as in the case of the sword object 104, the hit processing is executed for an enemy object 103 located on the above cutting attack trajectory. Then, as the above hit effect, an effect suitable for a striking weapon (e.g. displaying of the enemy object 103 being blown out) may be used. Further, a shooting weapon which fires a bullet along the above cutting attack trajectory 108 may be used. In this case, instead of displaying of the cutting attack trajectory 108 as shown in FIG. 15, a fired bullet may be displayed at a predetermined constant interval (e.g. displayed like horizontal sweeping fire), and in the hit processing, a hit effect such as displaying of a state where the bullet hits an enemy object may be drawn.

Further, regarding the cutting attack start point, in the above embodiment, a last pointing coordinate is set as the cutting attack start point 121. However, the present invention is not limited thereto, and a current pointing coordinate may be set as the cutting attack start point 121. Alternatively, the midpoint between the last pointing coordinate and the current pointing coordinate may be calculated, and the midpoint may be set as the cutting attack start point 121. Regarding the cutting attack end point 122, in the above embodiment, the current pointing coordinate is used. However, the last pointing coordinate may be set as the cutting attack endpoint 122, or the midpoint between the last pointing coordinate and the current pointing coordinate may be set as the cutting attack end point 122. In addition, in the case where a plurality of types of weapons are set as described above, regarding the first predetermined value and the second predetermined value for setting the cutting attack start point and the cutting attack end point, different values may be used depending on the type of a weapon. For example, a table in which the first predetermined value and the second predetermined value is defined for each weapon is prepared in advance, and read into the external main memory 12 when the game processing is executed. Then, the table is referred to when the processing of the flow chart shown in FIG. 29 is started, and a first predetermined value and a second predetermined value both of which correspond to a weapon set as a weapon held by the player object 101 may be obtained and used.

Further, when a cutting attack trajectory is drawn so as to have a predetermined shape, e.g. a circular shape, a triangular shape, and the like, the determination of collision in the hit determination processing at the step S14 may be made only for a region inside the shape.

Further, in addition to the aforementioned sword-fighting game, the present invention is applicable to games other than the sword-fighting game as long as predetermined processing is executed in the games only when a pointing position is moved at a predetermined speed or faster. For example, the present invention is applicable to a game such as a "quick writing game" (a game to compete for neat and quick handwriting) in which it is possible to write a character only when a cursor is moved at a predetermined speed or faster.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing a program which is executable by a computer of an image processing apparatus in accordance with data which is transmitted from an operating device used for pointing to a screen as a result of pointing the operating device at the screen, the program causing the computer to execute:
    determining a first pointing position to which the operating device points based on data transmitted from the operating device;
    after a period of time has elapsed, determining a second pointing position to which the operating device points based on data transmitted from the operating device;
    determining whether or not an amount of change between the first pointing position and the second pointing position in the time period satisfies a first condition; and
    when the amount of change between the first pointing position and the second pointing position over the time period satisfies the first condition, starting a processing operation in which the first pointing position is set as a start point of the processing operation.

2. The non-transitory computer-readable storage medium according to claim 1, wherein the program causes the computer to further execute:
    after the processing operation starts, determining whether or not the amount of change between the first pointing position and the second pointing position satisfies a second condition; and
    when the amount of change between the first pointing position and the second pointing position satisfies the second condition, ending the processing operation.

3. The non-transitory computer-readable storage medium according to claim 1, wherein the data that is transmitted from the operating device includes imaging information that is obtained by an image capturing device associated with the operating device, the image capturing device configured to capture an image of at least one target that is located adjacent to a display device, and further wherein
    the program causes the computer to determine whether or not the position of the target in a taken image exists in a screen correspondence range which is assigned to a screen of the display device.

4. The non-transitory computer-readable storage medium according to claim 3, wherein when the position of the target in the taken image exists in the screen correspondence range, and the amount of change between the first pointing position and the second pointing position satisfies the first condition, the processing operation is started.

5. The non-transitory computer-readable storage medium according to claim 3, wherein when the position of the target in the taken image does not exist in the screen correspondence range after the processing operation has started, the processing operation is ended.

6. The non-transitory computer-readable storage medium according to claim 2, wherein the program causes the computer to, during a period after the processing operation starts and until the processing operation ends, draw an object at a position on the screen corresponding to the calculated first pointing position.

7. The non-transitory computer-readable storage medium according to claim 2, wherein the program causes the computer to, during a period after the processing operation starts but before the processing operation ends, draw a trajectory connecting, in chronological order, the first and second pointing positions.

8. The non-transitory computer-readable storage medium according to claim 1, wherein the program causes the computer to further execute:
    during a period after the processing operation starts but before the processing operation ends, determining whether or not an object exists at a position in a virtual space corresponding to the first pointing position; and
    when it is determined that the object exists at the position in the virtual space corresponding to the first pointing position, performing hit processing operation for the object.

9. The non-transitory computer-readable storage medium according to claim 8, wherein,
    when the object exists at the position, changing a value of a continuation parameter which is a parameter indicative of whether or not to continue the processing operation,
    after the processing operation is started, determining whether or not the value of the continuation parameter satisfies a third condition, and
    when the value of the continuation parameter satisfies the third condition, ending the processing operation.

10. An apparatus for executing processing based on data which is transmitted from an operating device used for pointing to a screen as a result of pointing the operating device at the screen, the apparatus comprising:
    pointing position determining circuitry for determining a first pointing position to which the operating device points based on first data transmitted from the operating device and then determining a second pointing position to which the operating device points to based on second data transmitted from the operating device after a predetermined period of time;

change amount calculation circuitry for calculating an amount of change between the first pointing position and the second pointing position during the time period;

first determination circuitry for determining whether or not the amount of change between the first pointing position and the second pointing position satisfies a first condition; and processing start circuitry for, when the first determination circuitry determines that the change amount of the pointing position within the time period satisfies the first condition, starting a processing operation in which the first pointing position is set as a start point for the processing operation.

11. A method for executing processing based on imaging information which is obtained by imaging circuitry, of an operating device, for taking an image of at least one target and which imaging information is transmitted from the operating device, the method comprising:

determining, with a processor, a first pointing position to which the operating device points based on a position of the target in a first taken image;

determining, with a processor, a second pointing position to which the operating device points based on a position of the target in a second taken image after a period of time has elapsed;

calculating, with the processor, a change amount between the first pointing position and the second pointing position within the time period;

determining whether or not the change amount between the first pointing position and the second pointing position within the time period satisfies a first condition; and if determined that the change amount of the pointing position within the time period satisfies the first condition, starting a processing operation by the processor in which the first pointing position is set as a start point for the processing operation.

12. A system comprising:

a processor;

at least one input device coupled to said processor, the input device including an imaging device, where imaging information is transmitted from the operating device to the processor;

a memory coupled to said processor, said memory storing instructions that, when executed by said processor, control said processor to:

determine a first pointing position to which the operating device points based on a position of at least one target in a first taken image;

determine a second pointing position to which the operating device points based on a position of at least one target in a second taken image after a period of time;

calculate whether or not an amount of change between the first pointing position and the second pointing position over the time period satisfies a first condition; and when the calculated amount of change satisfies the first condition, perform a processing operation in which the first pointing position is set as a start point for the processing operation.

* * * * *